(12) United States Patent
Trost et al.

(10) Patent No.: US 7,546,099 B2
(45) Date of Patent: Jun. 9, 2009

(54) BLUETOOTH BASEBAND SOLUTION WITH REDUCED PROCESSOR REQUIREMENTS AND INTEGRATED HOST CONTROLLER

(75) Inventors: Theodore Trost, San Diego, CA (US);
Brima Ibrahim, Los Angeles, CA (US);
Alahyar Alan Mikhak, Calabasas, CA (US)

(73) Assignee: Broadcom Corporation, Irvine, CA (US)

( * ) Notice: Subject to any disclaimer, the term of this patent is extended or adjusted under 35 U.S.C. 154(b) by 1055 days.

(21) Appl. No.: 09/788,061

(22) Filed: Feb. 16, 2001

(65) Prior Publication Data
US 2002/0151275 A1   Oct. 17, 2002

Related U.S. Application Data

(60) Provisional application No. 60/183,076, filed on Feb. 16, 2000.

(51) Int. Cl.
*H04B 1/18* (2006.01)
*H04B 7/00* (2006.01)
(52) U.S. Cl. ............... 455/186.1; 455/41.2; 455/41.3
(58) Field of Classification Search ............ 455/186.1, 455/41.2, 41.3, 550.1, 412.1, 556.1, 183.2, 455/161.2, 164.2, 234.2; 370/379, 382; 711/100, 711/114, 161, 162, 170–173; 379/88.27, 379/88.28, 356.01, 357.02, 357.05; 345/558
See application file for complete search history.

(56) References Cited

U.S. PATENT DOCUMENTS

| 5,426,424 A | 6/1995 | Vanden Heuvel et al. |
| 5,680,582 A | 10/1997 | Slayden |
| 5,838,730 A * | 11/1998 | Cripps .................... 375/272 |
| 6,223,290 B1 * | 4/2001 | Larsen et al. ................. 726/3 |

FOREIGN PATENT DOCUMENTS

| WO | WO 99/56212 A | 11/1999 |
| WO | WO 99/59288 A | 11/1999 |

OTHER PUBLICATIONS

International Search Report for International Application No. PCT/US01/05064, dated Apr. 5, 2002.

* cited by examiner

*Primary Examiner*—Eugene Yun
(74) *Attorney, Agent, or Firm*—McAndrews, Held & Malloy, Ltd.

(57) ABSTRACT

Methods for removing complexity from a Bluetooth processor's firmware and placing them in hardware in order to use a simpler processor or to do other tasks in the Bluetooth processor. Assembling and managing communication packets and transmission, providing modulo divides, and allocating memory are typical firmware tasks for a Bluetooth device. By creating circuits that assemble and manage communications packets and transmits, provide modulo divides, and manage Bluetooth device memory a processing burden can be removed from the Bluetooth processor. This lessened processing requirement allows less expensive, e.g. slower, processors to be used, or other functions to be incorporated into the processor's firmware.

18 Claims, 25 Drawing Sheets

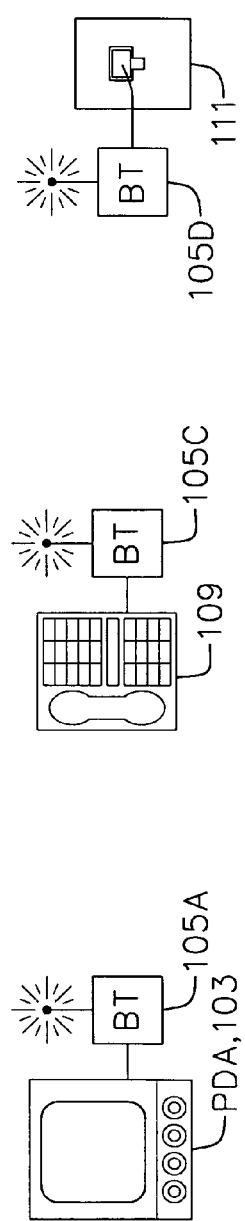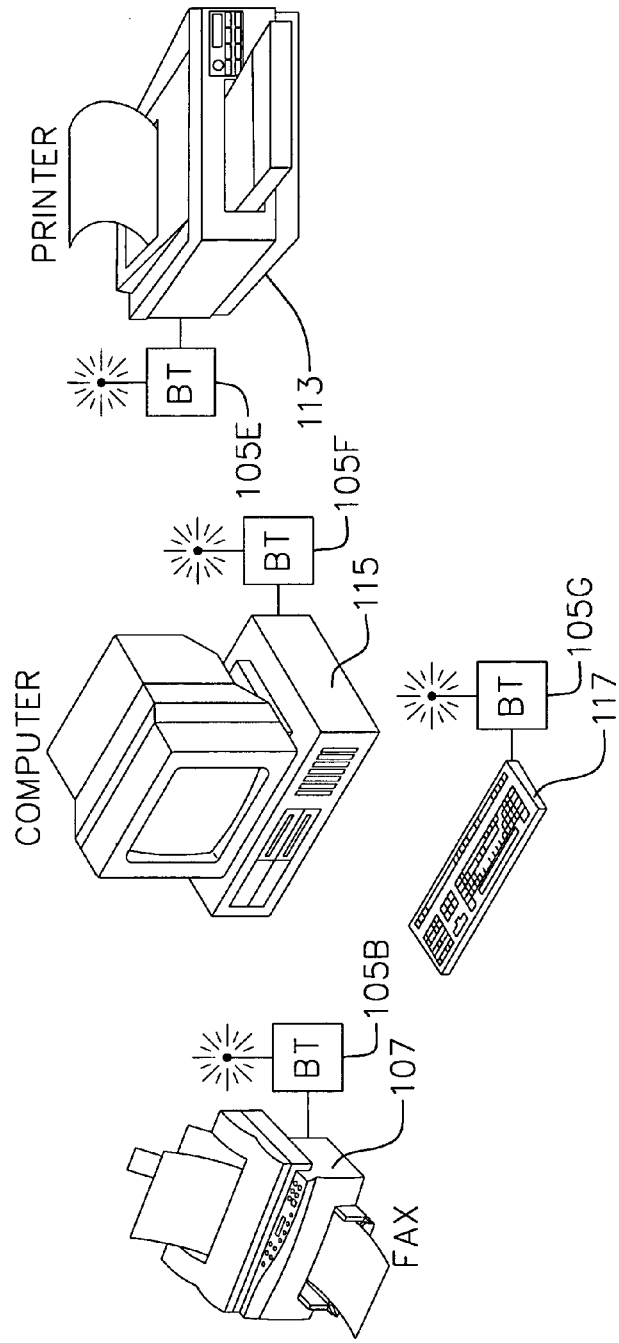
FIG. 1

FIG. 20

TABLE 1. PACKET TYPE PRIORITY — 2001

| RANGE LABEL | MIN BYTES IN BUFFER | MAX BYTES IN BUFFER | 1ST. CHOICE | 2ND. CHOICE | 3RD. CHOICE | 4TH. CHOICE | 5TH. CHOICE | 6TH. CHOICE |
|---|---|---|---|---|---|---|---|---|
| a | 0 | 0 | NULL | NULL | NULL | NULL | NULL | NULL |
| b | 1 | 17 | DM1 | DH1 | DM3 | DH3 | DM5 | DH5 |
| c | 18 | 27 | DH1 | DM3 | DH3 | DM5 | DH5 | DM1 |
| d | 28 | 121 | DM3 | DH3 | DM5 | DH5 | DH1 | DM1 |
| e | 122 | 183 | DH3 | DM5 | DH5 | DM3 | DH1 | DM1 |
| f | 184 | 224 | DM5 | DH5 | DH3 | DM3 | DH1 | DM1 |
| g | 225 | 339 | DH5 | DM5 | DH3 | DM3 | DH1 | DM1 |
| h | 339 | | DH5 | | | | | |

EXAMPLE OF A FRAGMENT CHOOSER FOR 16 FRAGMENTS, N=4
(FOR 127 FRAGMENTS N=7)

CIRCUIT TO CALCULATE CLK MOD Y, WHERE CLK IS 27 BITS AND T IS 8 BITS

THE FOLLOWING DIPICTS THE BYTE GAUGE STATE MACHINE IN FLOW DIAGRAM FORM. NUMBERS IN PARENTHESES INDICATE THE STATE.

L2CAP PACKET FLUSH STATE MACHINE

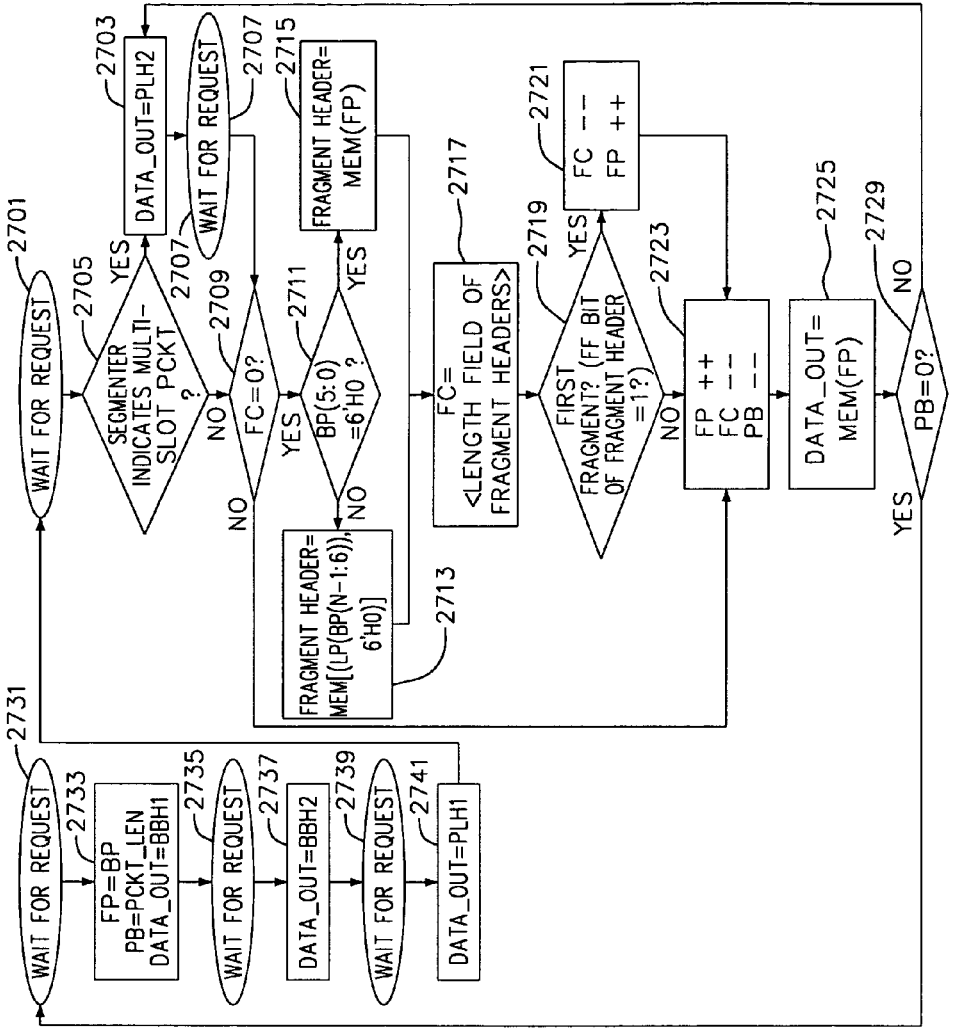
FIG. 27  L2CAP PACKET TRANSMIT STATE MACHINE

BLUETOOTH BASEBAND SOLUTION WITH REDUCED PROCESSOR REQUIREMENTS AND INTEGRATED HOST CONTROLLER

This Application claims priority to Provisional Application No. 60/183,076 entitled "Bluetooth baseband solution with reduced processor requirements and integrated host controller functionality," filed on Feb. 16, 2000.

FIELD OF THE INVENTION

The present invention relates to Bluetooth wireless communication circuits, and in particular embodiments to reducing Bluetooth processor requirements by incorporating common processor functions within dedicated hardware circuitry.

BACKGROUND OF THE INVENTION

Bluetooth refers to an open specification describing a technology which enables short range wireless data and voice communication.

There are many examples of short range communications within the field of computing and communications. A great variety of cables are commonly used for interconnecting personal computers, monitors, keyboards, fax machines, networks, etc. so that they may communicate with each other. Much of this communication now takes place over cables. Such cables connect a plethora of different devices. These cables are of various lengths and have a wide variety of connectors. Some cables are standardized, but many come with connectors having a variety of shapes, sizes, number of pins and wiring. Coping with such a great variety of cables can be burdensome to users. By using Bluetooth technology, instead of communicating over cables, devices can communicate in a wireless fashion over an air interface using the 2.4 gigahertz ISM (Industrial Scientific and Medical) frequency band.

SUMMARY OF THE INVENTION

Bluetooth is an open specification produced by the Bluetooth special interest Group (SIG) and is available from Bluetooth.com. This specification is incorporated by reference as though set forth in full.

In a first example of the invention a wireless communication device is disclosed. The wireless communications device comprises a wireless transceiver and a processor coupled to the wireless transceiver. The processor has a memory comprising a plurality of fragments and an array configured to control the sequence of memory fragments from which the data is read.

In a second example of the invention a processor having memory which is comprised of a variety of fragments is disclosed. Additionally, the processor includes an array configured to control the sequence of memory fragments from which the data is read.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

The above summarized aspects, as well as other aspects, features, and advantages of the present invention will become better understood with regard to the following description, appended claims, and accompanying drawings where:

FIG. 1 is a graphical representation of an example Bluetooth environment.

" FIG. 20 is a table relating the number of bytes to be transmitted to the packet type priority.

FIG. 27 is a flow diagram of an L2CAP packet transmit state machine, according to an embodiment of the invention.

DETAILED DESCRIPTION OF EMBODIMENTS OF THE INVENTION

In the following description, reference is made to the accompanying drawings, which form a part hereof, and in which is shown, by way of illustration, specific embodiments illustrating ways in which the invention may be practiced. It is to be understood that other embodiments may be realized, as the inventive concepts disclosed herein may be used in the design and fabrication of other embodiments, without departing from the scope and spirit of the inventive concepts disclosed herein.

Accordingly, embodiments of the present invention relate, generally, to wireless communication systems. However, for the purposes of simplifying this disclosure, the embodiments are described herein with relation to Bluetooth networks. Although the described exemplary embodiments disclosed herein are directed to Bluetooth networks, there is no intent to limit the invention to the example embodiments. The exemplary embodiments are intended to illustrate inventive aspects of the present invention, which are applicable to a wide variety of electronic systems.

FIG. 1 is a graphical representation of an exemplary Bluetooth environment. In FIG. 1 the following Bluetooth systems are illustrated. A Personal Digital Assistant (PDA) 103 is coupled to a Bluetooth wireless transceiver 105A. A fax machine 107 is coupled to a Bluetooth wireless transceiver 105B. A telephone 109 is coupled to a Bluetooth wireless transceiver 105C. A telephone network, represented by telephone wall plug 111, is coupled to a Bluetooth wireless transceiver 105D. A printer 113 is coupled to a Bluetooth wireless transceiver 105E. A computer is coupled to a Bluetooth transceiver 105F. A keyboard is coupled to a Bluetooth transceiver 105G. By using Bluetooth technology all of the devices of FIG. 1 can communicate with each using Bluetooth radio frequency (RF) connections without interconnecting cables.

Figure 2A:
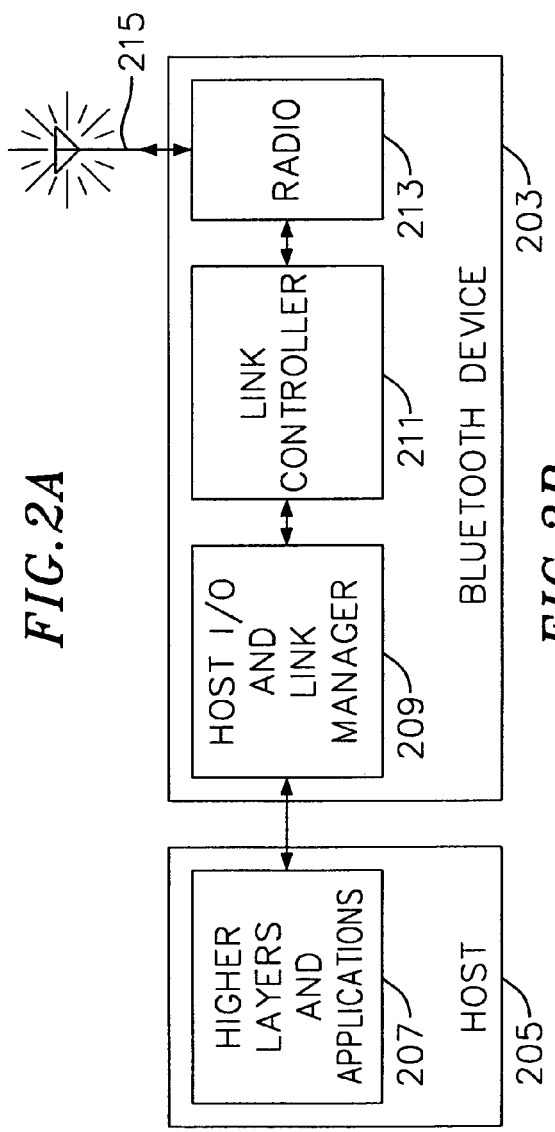
FIG. 2A is a graphical illustration of the high-level functional composition of a Bluetooth module.

FIG. 2A is a graphical illustration of the high-level functional composition of a Bluetooth module. In FIG. 2A an application 207, within a host 205 communicates with Bluetooth device 203. The application 207 may communicate with a Bluetooth device 203. In the Bluetooth device 203 a host I/O (input/output) and link manager functions 209 communicate with a application 207, which is running in the host. The host I/O and link manager 209 communicates the higher layers and applications 207 within the host.

The host I/O and link manager 209 communicates with the link controller 211 which controls the flow of data between the applications 207 and a Bluetooth radio 213. The link controller 211 accepts data from the Bluetooth radio 213 and provides the data to the host I/O and link manager for communication across the host I/O to the higher layers and application module 207. Data coupled into the host I/O and link manager 209, from the higher layers and applications 207, are provided to the link controller 211. The link controller 211 controls the data flow to the Bluetooth radio module 213. The Bluetooth radio module accepts communications from and provides communications to an antenna 215, which in turn provides an over the air RF (Radio Frequency) link.

Figure 2B:
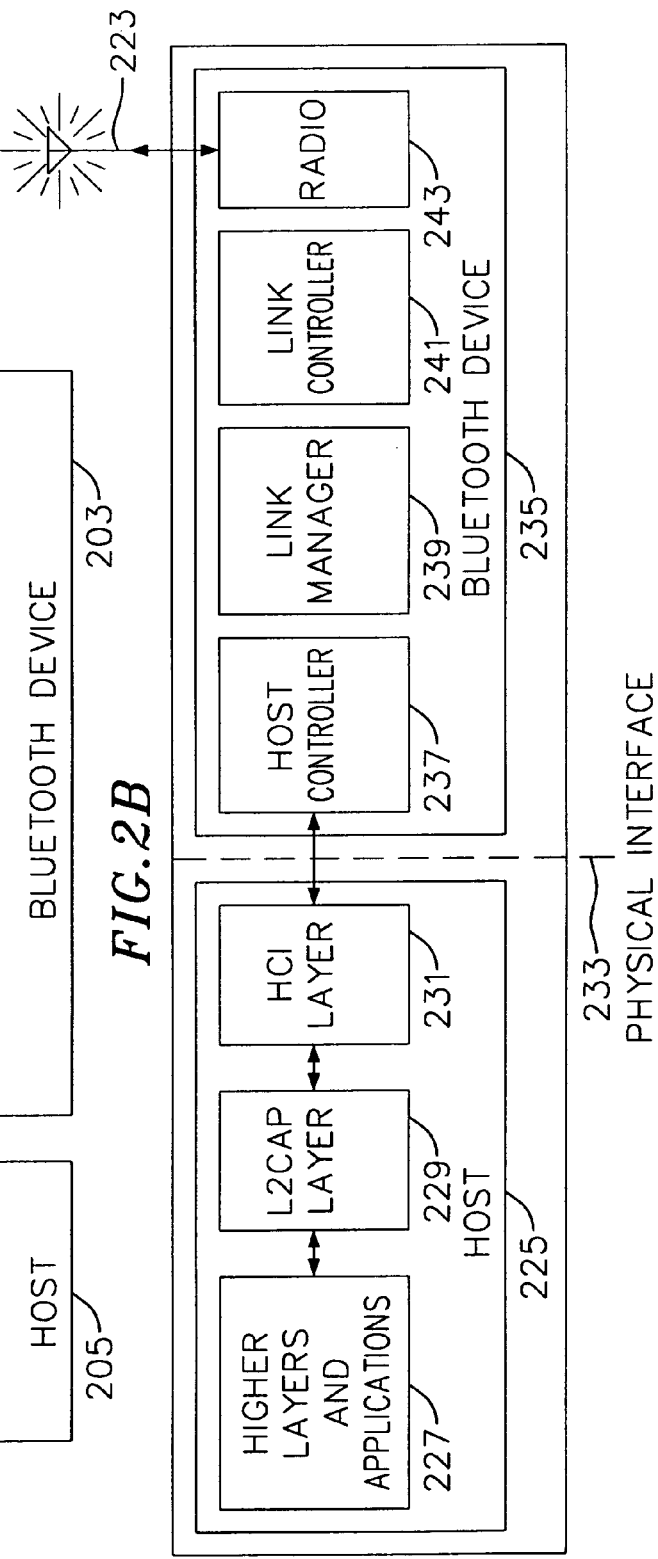
FIG. 2B is a graphical illustration of protocols within the Bluetooth system illustrated in FIG. 2A.

FIG. 2B is a graphical illustration of protocols within the Bluetooth system of FIG. 2A. In FIG. 2B higher layers and applications 227 communicate with a L2CAP (Logical Link Control and Adaptation Protocol) layer. The L2CAP layer 229 is a software component that provides a standard interface for the transfer and reception of control and application data to and from a Bluetooth device 235. The L2CAP layer 229 in turn communicates with a HCI (host controller interface), which forms the interface between the L2CAP layer 229 and various physical interfaces 233. The various physical interfaces 223 may comprise, for example, RS-232 ports, USB (universal serial bus) ports, a UART (Universal Asynchronous Receiver Transmitter), or other physical interfaces. The HCI (Host Communications Interface) layer 231 comprises an HCI communications protocol from the host controller 237 within the Bluetooth module 235 to the host. The host controller 237 and link manager 239 are a further illustration of the functions within the host I/O and link manager 209 of FIG. 2A. The link controller 241 is the functional equivalent of the link controller 211 of FIG. 2A. The Bluetooth radio 243 as well as the Bluetooth antenna 223 are also functionally equivalent to the corresponding modules of FIG. 2A.

Figure 2C:
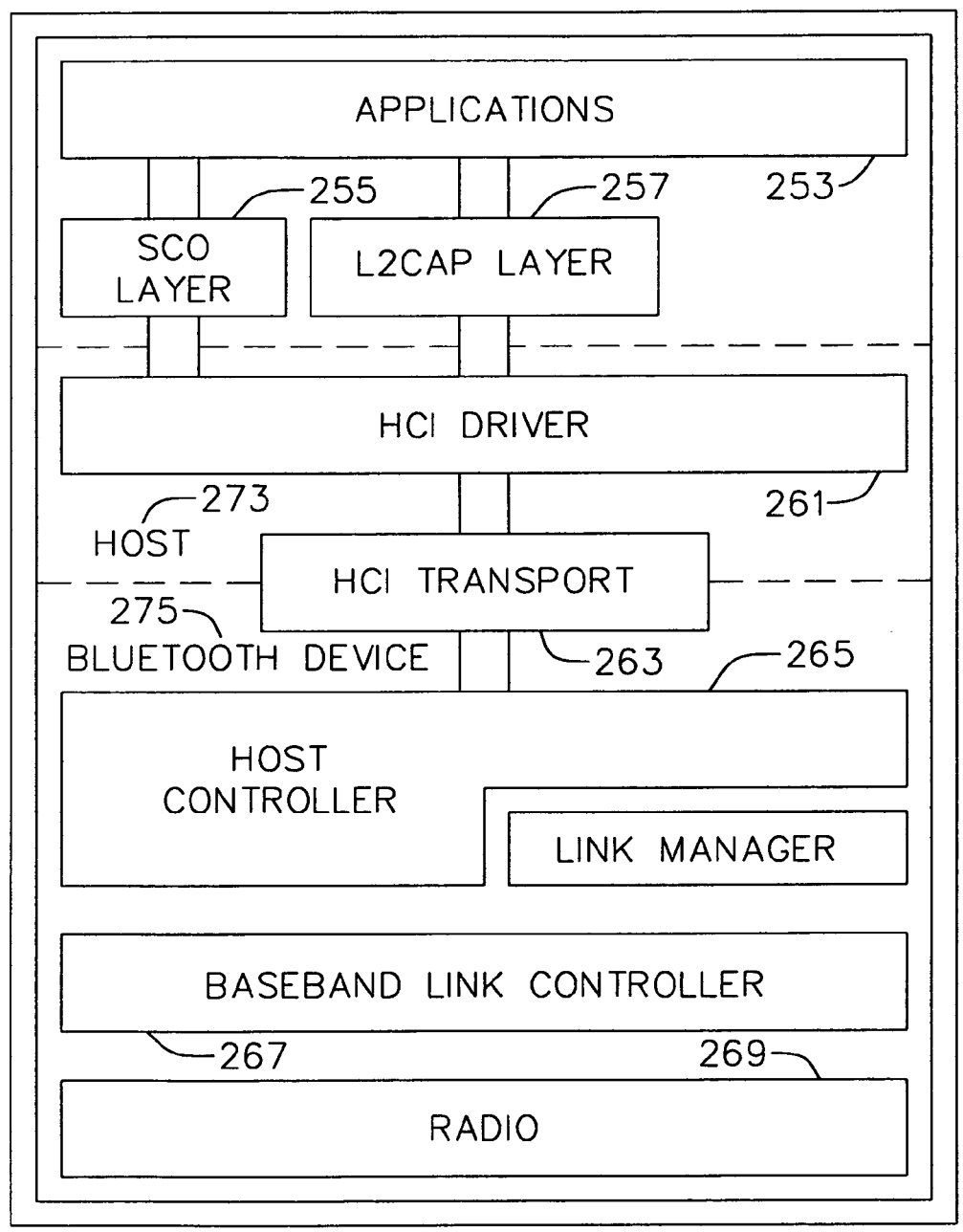
FIG. 2C is a generalized graphical representation of a Bluetooth device having a host interface.

FIG. 2C is a more detailed graphical representation of an example Bluetooth device having a host interface. The applications 253 communicate to an HCI (host controller interface) driver 261 through protocols 255 and 257.

Protocol 257 is the previously mentioned L2CAP protocol layer. The L2CAP protocol layer deals with the transport of L2CAP data packets.

The SCO (synchronous connection) layer 255 manages the transport of isochronous data, such as voice communications, between applications 253 and the HCI driver 261. Each of the protocol layers, the SCO layer 255 and the L2CAP layer 257 provide layers for the purpose of communicating with applications 253 in a standardized way.

The HCI driver 261 provides a standard interface between the SCO layer 255 and the L2CAP layer 257 and the HCI driver layer 261. The HCI driver 261 communicates data to the HCI transport layer 263. The HCI transport layer 263 provides for the transport of data across whatever physical interface 251 is present. The physical interface 251 may comprise a variety of interfaces for example USB, UART (Universal Asynchronous Receiver/Transmitter) or RS-232. Within the Bluetooth device 275, the host controller 265, provides HCI transport layer services the host controller and link manager interface with the baseband link controller 267. Baseband link controller 267 controls the flow of data to and from the Bluetooth Radio 269.

Figure 3:
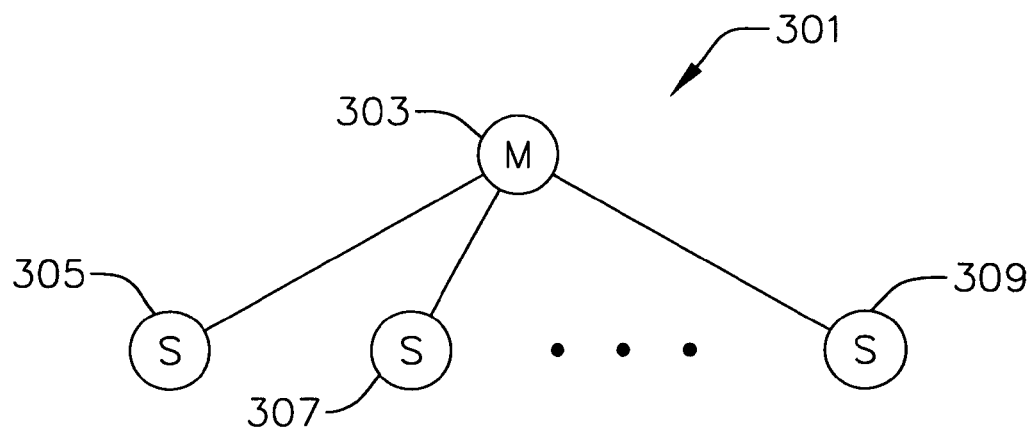
FIG. 3 is a graphical representation of the topology of a basic Bluetooth network.

FIG. 3 is a graphical representation of the topography of a basic Bluetooth network. The basic entities of a Bluetooth network are the master and slave devices. A master device 303 may have up to 7 slaves, for example slave devices 305, 307 and 309. Each slave can have at most one master at any given time but may have different masters at different times. Each master can have up to seven slaves at any given time.

An arrangement of Bluetooth devices 301 such as depicted in FIG. 3 is called a piconet. A characteristic of a piconet is that all of the devices in a piconet are synchronized to the master's clock. When a master 303 establishes a connection to a slave, for example slave 305, 307 or 309, the slave device synchronizes to the master clock. The master device itself can be a slave to another master as illustrated in FIG. 4.

Figure 4:
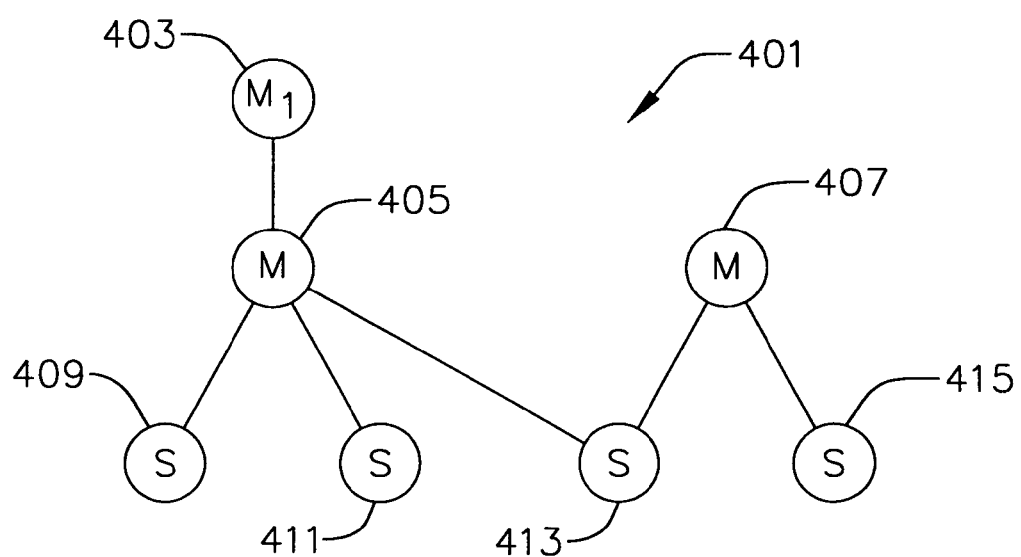
FIG. 4 is a graphical illustration of a scatternet Bluetooth network.

FIG. 4 is a graphical illustration of a scatternet type Bluetooth type network. A scatternet has more than one master device and accordingly more than one master clock. In FIG. 4, master device 405 is the master device for slave devices 409, 411 and 413. However, master 405 is a slave device to master 403. Additionally, a master may share slaves on a time division basis. For example, a master 405 may control a slave 413 for a first time period. During a second time period master 407 may control slave 413, as well as controlling slave 415.

In a scatternet, such as 401, master 405 may have to have several clocks running concurrently. For example, master 405 may establish connection with slave devices 409 and 411 thus causing the clocks within slaves devices 409 and 411 to synchronize with master 405. Master 403 may then establish a connection to device 405. Device 405 is a slave device to master 403 and hence must synchronize a clock to the master clock in master device 403, for the purposes of communicating with master device 403. Thus, device 405 will have a master clock, which will be used to communicate with slaves 409 and 411. Device 405 must also synchronize, as a slave, to master device 403 and so must also have a copy of device 403's clock.

In the case of a shared slave device 413 when communicating with master 405 slave 413 will synchronize to master 405's clock. When slave 413 is communicating with master device 407 it will synchronize to master device 407's clock.

Figure 5:
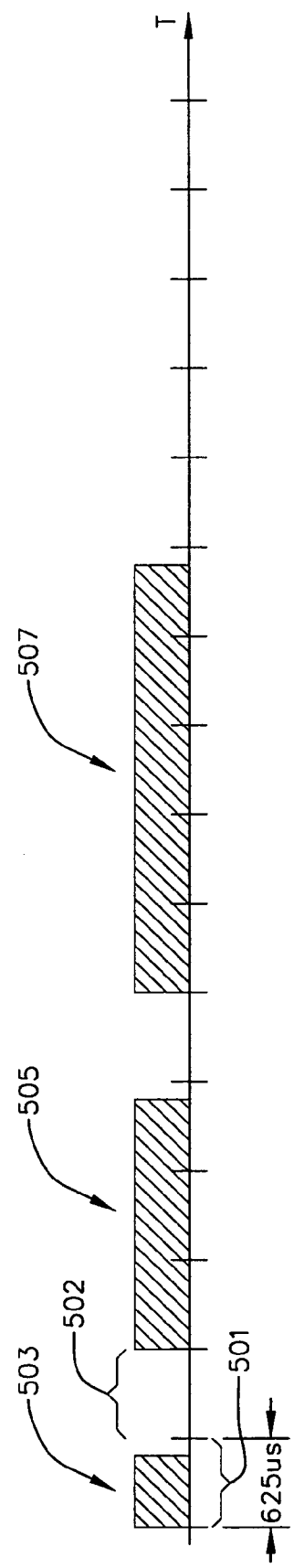
FIG. 5 is a graphical illustration of Bluetooth clock timing.

FIG. 5 is a graphical illustration of Bluetooth clock timing. Every Bluetooth device has a native free-running 28-bit Bluetooth clock. The native Bluetooth clock ticks once every 312.5 microseconds. Two ticks of a native Bluetooth 312.5 microsecond clock form a transmission unit known as a slot, which is the basic Bluetooth transmission unit. Each transmission slot is 625 microseconds wide; accordingly the slot clock has a period of 625 microseconds. Generally, Bluetooth networks are set up such that at any given time one device is transmitting and one device is listening. Generally when a transmission is directed to a device, the device must reply to the transmitting device in the next slot after the transmission. Master devices, however, also have a broadcast mode, which enables a master to transmit to all of its slaves. All of the master's slaves will listen to decode such a transmission. In the case of a broadcast to all slaves, no reply from the slaves is required.

A master device will start transmission only during even slots. The slave, receiving the master's transmission will then reply during the next odd slot after the master's transmission. This arrangement is illustrated in FIG. 5.

In FIG. 5 master transmission 503 occurs during even slot 501. The slave listening to the transmission will then reply in slot 502. Each transmission comprises a data packet. A data packet can be 1, 3 or 5 slots in length. A master's transmission, however, must always begin and end on an even slot thereby enabling the slave to answer during an odd slot. A transmission packet broadcast, such as 505, occupies 3 slots and a transmission packet broadcast such as 507 occupies 5 slots.

Bluetooth networks are frequency hopping systems. That is the broadcast frequency changes after every packet transmission. So for example if a master broadcast on slot 503 using frequency $F_n$ then the slave would reply on slot 502 using frequency $F_{n+1}$. If the master subsequently broadcasts a three slot packet 505, the broadcast would be on frequency $F_{n+2}$. Frequency $F_{n+2}$ would be maintained for all three slots of the broadcast 505. In multi-slot packets the broadcast frequency does not change. Accordingly in a five slot packet 507 the frequency of broadcast would remain consistent during all five slots.

When a master address a slave, the slave must reply in the next available odd slot.

Each packet transmission has an address within it so that each slave knows when it is being addressed. Each packet has, in addition to an address, some flow control information as well as information designating what type of packet is being sent. The address includes 3 bits thus allowing an individual address for each one of the seven slaves and a separate address for broadcast mode to all the slaves. Slaves may be allowed to us one, three or five slots in responding to the master.

There are several classifications for Bluetooth packets. A first classification distinguishes between uncoded and coded packet types. Coded packet types have forward error correction (FEC) included whereas uncoded packets types do not. Packets may also be classified by length as one slot, three slot and five slot packets. There are in general 2 types of Bluetooth packets ACL and SCO. ACL (asynchronous connection link) may be one, two or three slots long and can be coded or uncoded. In general, all packet exchanges can be initiated by the master on even slot. Bluetooth uses a repeat request scheme in which ACL packets are transmitted and retransmitted until the destination indicates successful reception by returning an acknowledgment. An unnumbered acknowledgment scheme is used, in which the previously received packet is acknowledged or not. Acknowledgment is indicated when the ARQN bit in the Bluetooth packet header is set to "1" (ACK). When the ARQN bit in the Bluetooth packet header is set to "0", a NAK (Not Acknowledged) is indicated.

Additionally, there is a type of packet known as SCO (synchronous connection oriented) which are used for reserved bandwidth communications. SCO packets are used, for example, for voice data transfer between two devices. SCO packets are characterized in that they reserve periodic transmission (and reception) slots on a Bluetooth communication channel. Such a connection is known as a isochronous connection. SCO packet links can be established only after an ACL link has first been established.

Figure 6:
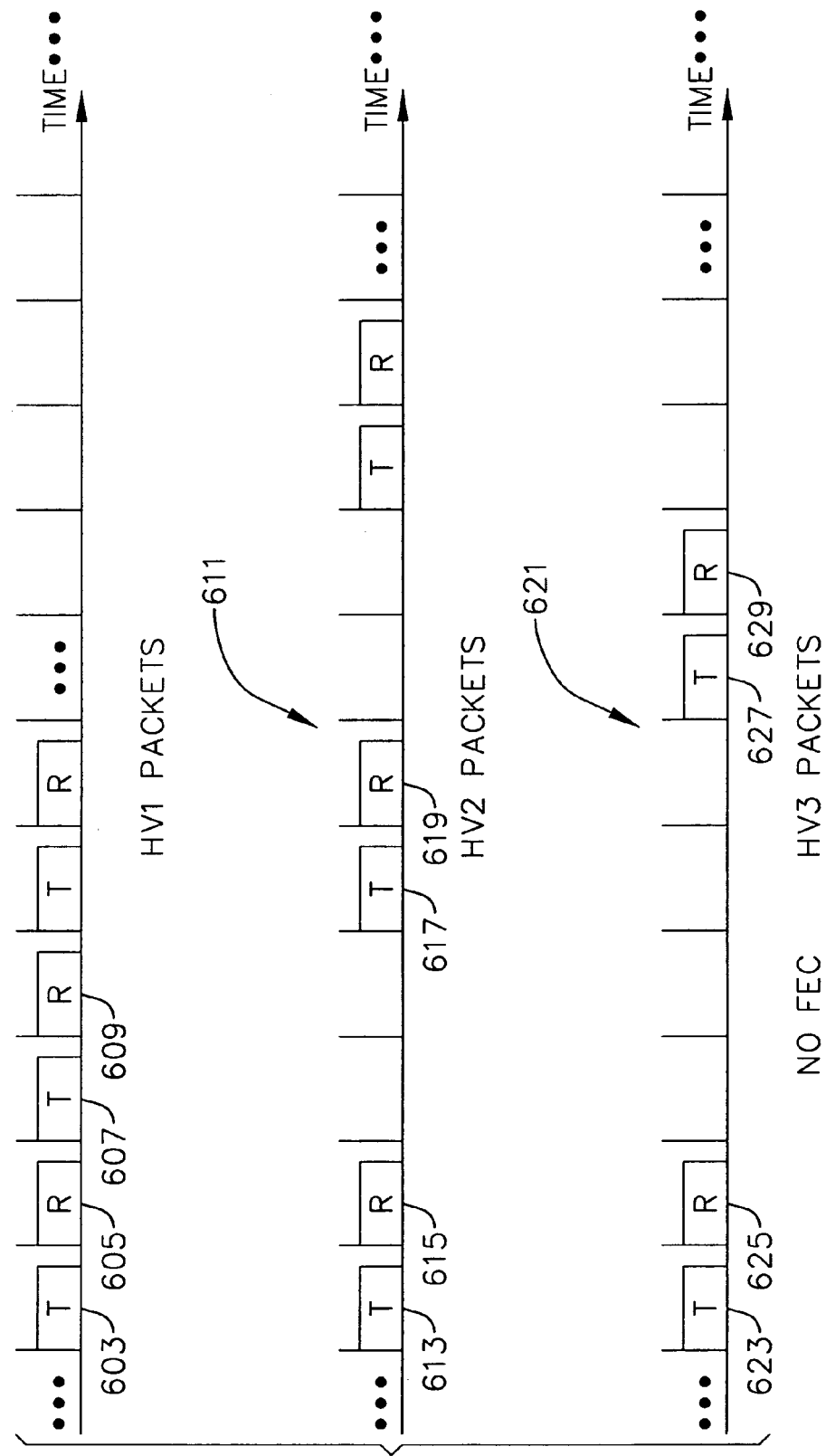
FIG. 6 is a graphical illustration of the slot timing of SCO data packets.

FIG. 6 is a graphical illustration of the slot timing of different versions of SCO packets. Two different parameters generally define the SCO packet type. The first SCO parameter, T, describes the periodicity of SCO transmissions many slots a packet will encompass. T may be 2, 4 or 6. A second SCO parameter D is used to define the offset of the SCO transmission within period T. If T equals 2 a transmission occurs every second slot. If T equals 4 a transmission occurs every fourth slot and if T is 6 a transmission occurs every sixth slot.

A characteristic of SCO packet transmission is that the data rate is 64 kilobytes per second regardless of the T or D parameters. Therefore, if D equals four then the packets will contain twice as much data as packets whose D is equal to 2. If D equals 6 the packets will contain three times as much data as packets in which D equals 2. SCO packets T=2, 4, and 6 are illustrated in FIG. 6. At 601 in FIG. 3 HV1 packets where Y=2 are illustrated. A first transmission 603 is followed by a receive 605 in a successive slot. The receive 605 is then followed by a transmit 607 in a successive slot and the transmit 607 is followed by a receive in a successive 609. This version of SCO packet is known as a HV1 packet. HV1 packets have forward error correction added, such that the packets are rate ⅓. That is 3 bits are transmitted to send 1 bit of data. The additional 2 bits transmitted comprise forward error correcting (FEC) coding.

HV2 packets are illustrated at 611 in FIG. 6. A first transmit packet 613 is followed by a receive packet 615. Two slots are then skipped and the second HV2 is transmitted at 617 followed by a receive at 619. Two packets are then skipped and another transmission begins. HV2 packets have forward error correction coding such that the rate of the code is ⅔. That is each 3 bits transmitted comprise 2 bits of data.

HV3 packets are illustrated at 621 in FIG. 6. A first transmission 623 occurs followed by a reply 625. Four packets are then skipped and then a second transmission 627 occurs followed by reply 629. HV3 type packets contain no forward error correcting codes so that each bit transmitted represents one bit of data. All three packets HV1, HV2 and HV3 transmit at the same data rate. The amount of forward error correcting and coding within each packet varies, and hence the total number of bits transmitted varies.

A third category of packet is the LMP (link manager protocol) packet. LMP packets are ACL type packets, which are sent to manage the connection link between devices rather than transfer data. LMP packets are always one slot packets.

ACL packets are given Bluetooth designations according to their length and the error coding present. A DM1 packet is a one slot ACL packet having forward error correcting coding. A DH1 packet is a one slot ACL packet having no error correcting coding. A DM3 packet is a three slot ACL packet having error correcting coding. A DH3 packet is a three slot ACL packet having no error correcting coding. A DM5 packet is a five slot ACL packet having error correcting coding. A DH5 packet is a five slot ACL packet having no error correcting coding. LMP packets are always sent using DM1 packets.

Figure 7:
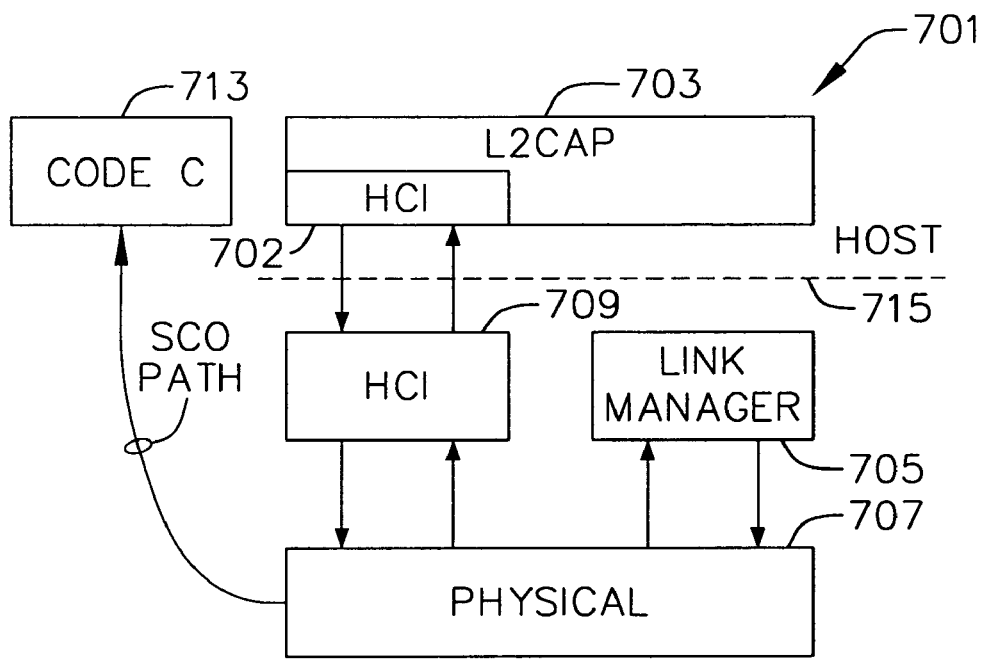
FIG. 7 is a graphical illustration representing pathways for various data packets within the layering of the Bluetooth protocol.

FIG. 7 is a graphical illustration representing the path of various data packets within the layering of the Bluetooth protocol. The L2CAP layer 703 is generally considered the highest layer within the Bluetooth protocol. The L2CAP layer is typically implemented within a host 715. The HCI layer 709, which communicates with the L2CAP layer 703 through a HCI layer 702, is usually implemented within the Bluetooth device and in the host. Part of the HCI layer 709 within the Bluetooth device is commonly implemented within firmware. The HCI layer 709 is coupled to the physical layer 707. ACL type packets travel back and forth between the L2CAP layer 703, the HCI 709 and the physical layer 707. The physical layer 707 forms the various packet types such as DM1, DH1, HV1, etc. The physical layer 707 provides functions such as encryption, whitening, and encoding. L2CAP packets, which may be up to 64 KB (kilobytes) in length, are communicated to the HCI 709 layer, along which then reformats the L2CAP packets into HCI packets. The HCI layer 709 takes the HCI packets and puts them into a form that is compatible with the physical layer 707.

The SCO packets typically have their own path between the physical layer 707 and a transmission mechanism such as a codec 713. SCO packets, however, may also go from the physical layer through the HCI layer 709, through the L2CAP layer 703, and subsequently to the host 715.

Figure 8:
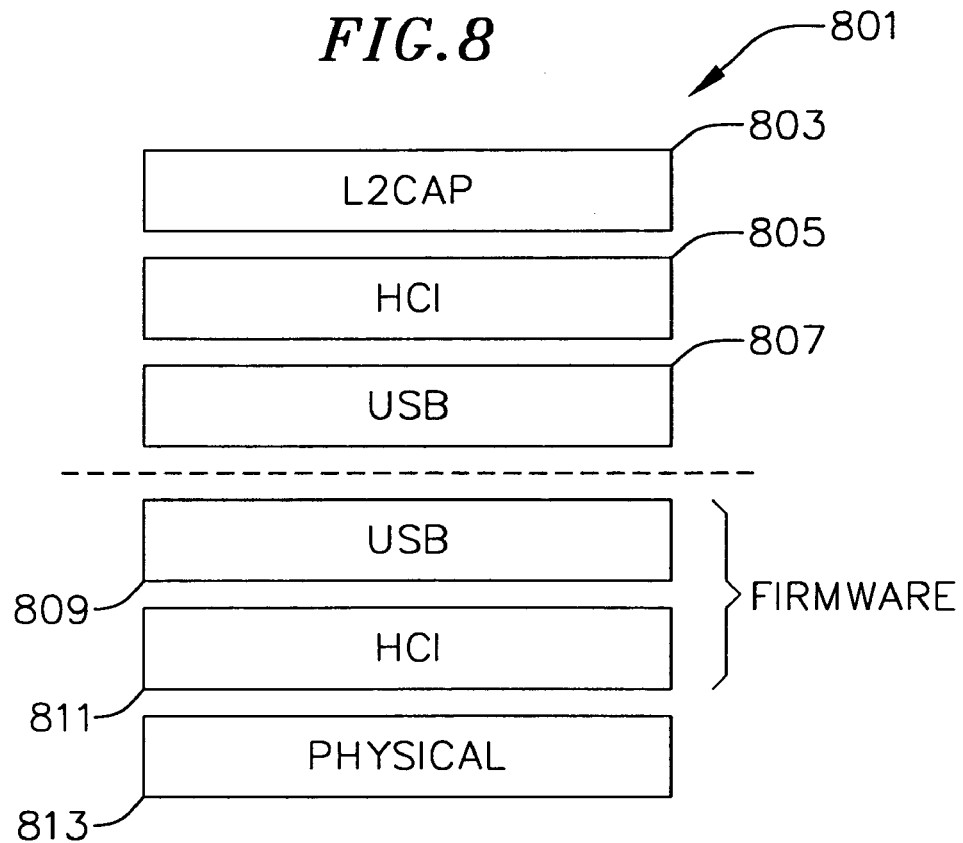
FIG. 8 is a graphical illustration of a protocol layering diagram of a Bluetooth device coupled to a computer via a USB (Universal Serial Bus).

LMP packets are coupled between a link manager 705 and the physical layer 707. The link manager 705 is used to negotiate packet types between Bluetooth devices, as well as to setup encryption. The link manager 705 is also used for setting up SCO links and for other link management functions FIG. 8 is a graphical illustration representing protocol layering, as might be found within a Bluetooth device coupled to a personal computer (PC) via a USB (Universal Serial Bus). The L2CAP protocol 803 will is executing in the PC. The L2CAP protocol 803 communicates with a host controller interface (HCI) 805. Host controller interface 805 will then communicate with a USB module 807. Bluetooth device is then coupled via USB layer 809 to the USB layer 807 within the computer. The USB within the Bluetooth device 809 then communicates with the host controller interface (HCI) 811, which in turn communicates with the physical layer 813 in the Bluetooth device.

So, for example, something is typed on a keyboard. The input from the keyboard would be then converted into L2CAP packets in L2CAP layer 803. The L2CAP packets would be then communicated to the HCI layer 805 which would convert the L2CAP packets into HCI packets. The HCI packets would then be converted into USB packets in the USB layer 807 and coupled across the USB bus to the USB layer 809 within the Bluetooth device. The USB packets would then be reassembled into HCI packets in HCI layer 811, and then further coupled into the physical layer 813. Commonly the USB layer 809 and HCI layer 811 are implemented in firmware within the Bluetooth device.

One of the features of the present invention is that the HCI layer, which typically exists in a firmware implementation, is converted into a hardware implementation. The burden on the processor, which ordinarily executes the HCI firmware in the HCI layer, is thereby lessened by converting the typical firmware implementation into a hardware implementation,. In other words, in one embodiment of the invention, the data packet flow between the L2CAP layer 803 and the physical layer 813 will be converted from a typical firmware implementation into a hardware implementation.

Various embodiments of the invention will describe functions, ordinarily programmed within a typical firmware implementation, that will be accomplished in hardware. These approaches allow either less expensive (e.g. 8 bit instead of 16 bit) processors to be used, or for additional functions to be run in the unburdened processor, or both.

According to embodiment of the invention there are three FIFO structures within the physical layer, which accommodate the transmission of data packets, and three FIFOs within the physical layer, which accommodate the reception of data packets.

Figure 9:
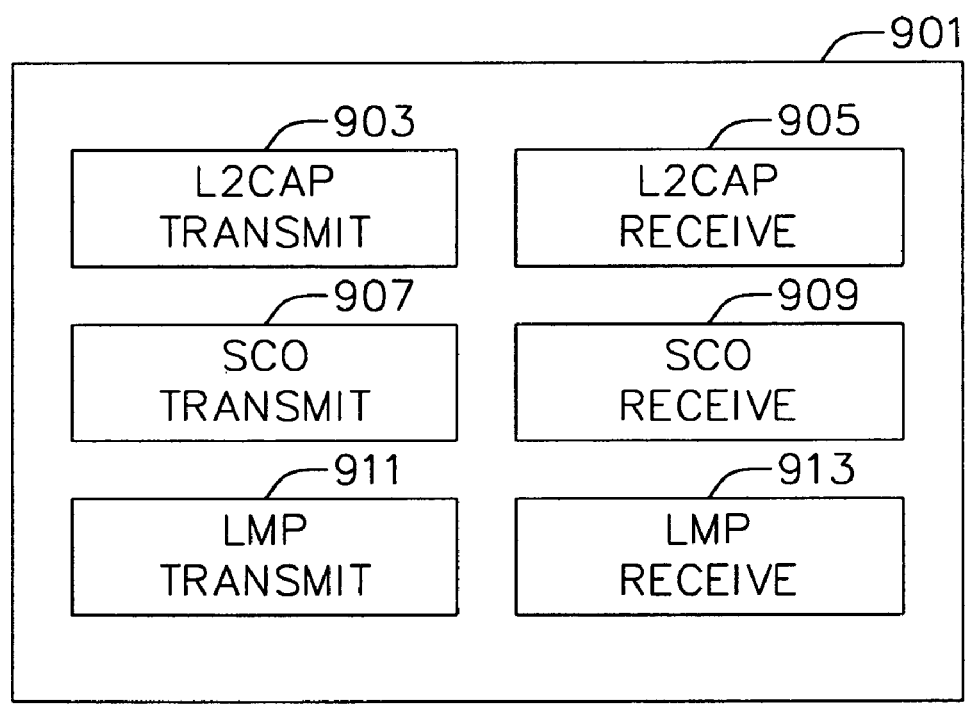
FIG. 9 is a graphical illustration of the six transmit and receive FIFO (First In First Out) structures within the physical layer, according to an embodiment of the invention.

FIG. 9 is a graphical illustration of six transmit and receive FIFO structures within the physical layer. In FIG. 9 three FIFO structures accommodate the transmission of packets. The L2CAP transmit FIFO structure 903 accommodates the transmission of L2CAP type packets. The SCO transmit FIFO structure 907 accommodates the transmission of SCO type packets. The LMP transmit FIFO structure 911 accommodates the transmission of LMP type packets. The L2CAP receive FIFO structure 905 accommodates the reception of L2CAP type packets. The SCO receive FIFO structure 909 accommodates the reception of SCO type packets. The LMP receive FIFO structure 913 accommodates the reception of LMP type packets.

In an embodiment of the invention, firmware will no longer be used to access the L2CAP transmit FIFO. Instead the L2CAP transmit FIFO will be controlled by HCI hardware. By removing the FIFO management functions from the HCI firmware a significant burden is removed from the HCI firmware processor thus enabling the HCI firmware processor to accomplish other tasks, or alternatively allowing a less powerful HCI firmware processor to be used. The term L2CAP FIFO is somewhat misleading. In actuality several logical FIFOs are created within the fragmented memory, which comprises the L2CAP transmit memory. For the sake of simplicity of nomenclature, however, the L2CAP transmit memory will be referred to as the L2CAP FIFO. Additionally, examples which apply to any of the transmit FIFOs will be referred to simply as transmit FIFOs.

The SCO FIFO, like the L2CAP FIFO may be implemented as a fragmented memory. In such a case the SCO packets may be accommodated by the same FIFO as the L2CAP packets, or the SCO packets may be accommodated by a different FIFO also with a fragmented structure.

The present embodiment includes an L2CAP transmit FIFO. Details of the transmit FIFO are the same whether the transmit FIFO is used to transmit SCO packets, L2CAP packets or both.

Because transmit FIFOs may manage multiple connections implementations may split their transmit FIFO into multiple FIFOs. For Example one for each device. This expedient of splitting the transmit FIFO into multiple FIFOs can make it easier to manage the individual FIFOs, but has a serious drawback. The drawback occurs because the physical layer and the L2CAP layer have a high level data flow control mechanism. The L2CAP layer communicates to be physical layer how much memory is available in the host device. The physical layer in turn communicates in turn to the L2CAP layer how much memory is available in the physical layer. In this manner the physical layer can moderate the data flow from the L2CAP layer depending on how much memory is available in the physical layer. The L2CAP layer can also moderate the data flow from the physical layer depending on how much memory is available in the L2CAP layer. When each connection has a transmit FIFO, within the physical layer the amount of memory remaining within the physical layer does not necessarily indicate what level of data flow the physical layer can accommodate. Total memory may not be representative of what level of data flow the physical layer can accommodate because one or more of the transmit FIFOs may be nearly full and the other FIFOs may be nearly empty. The amount of memory does not reflect the moderation of data flow needed to accommodate the nearly full transmit FIFO. Therefore, if one transmit FIFO is used per connection, the transmit FIFO management is simplified but the data flow management between the physical layer and the L2CAP layer is made substantially more complicated. Accordingly, pooling the memory in a memory management type fashion has significant advantages when used in concert with the Bluetooth messaging mechanism that reports the amount of memory available between the physical and L2CAP layers.

Figure 10:
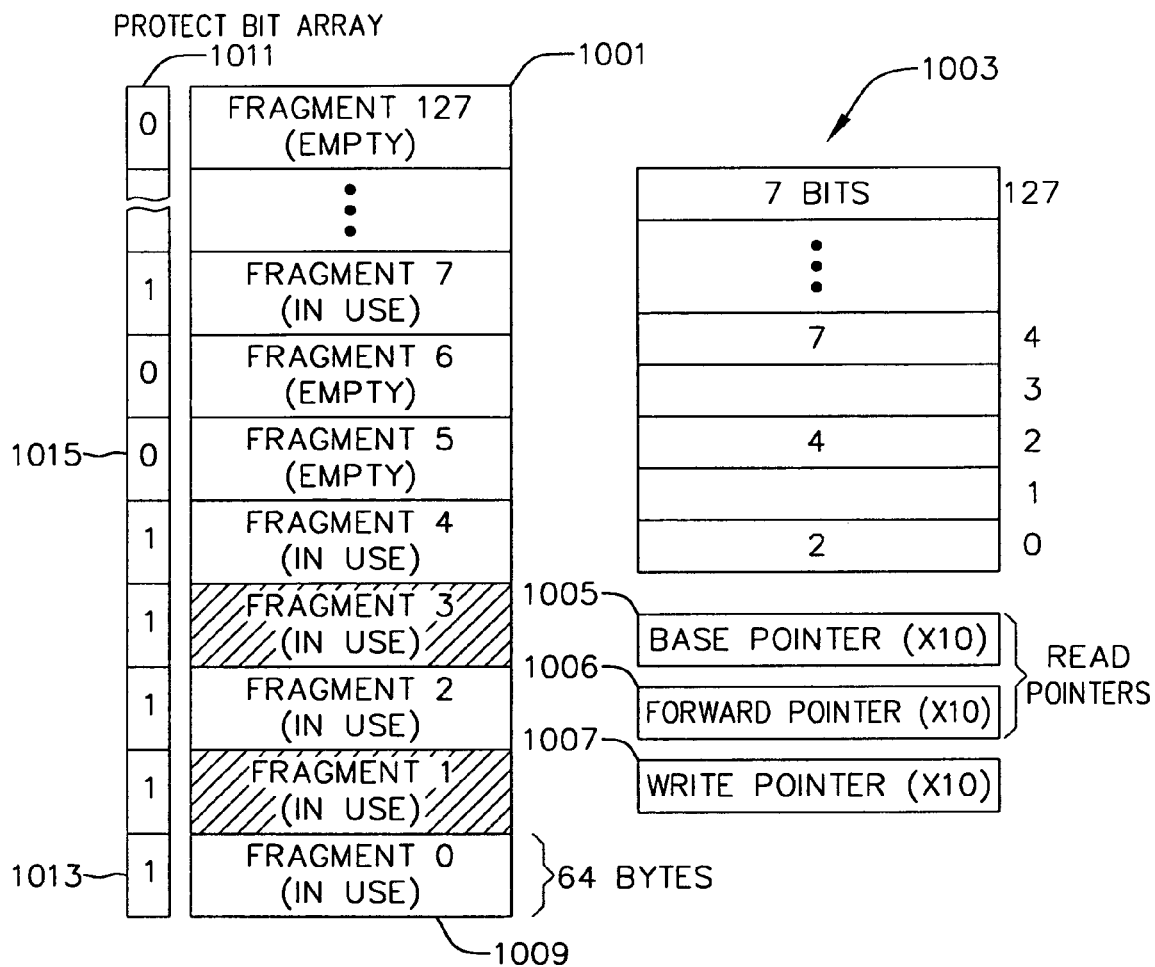
FIG. 10 is a graphical representation of a transmit FIFO and ancillary structures according to an embodiment of the invention.

FIG. 10 is a graphical representation of a transmit FIFO and ancillary structures according to an embodiment of the invention. The transmit FIFO 1001 is arranged in a series of fragments. In the present implementation 128 fragments of 64 bytes each are used. Those skilled in the art will recognize that the size of the fragments, as well as the number of fragments are dictated by the requirements of individual implementations. Although the present embodiment utilizes 128 fragments of 64 bytes each, other implementations might find other fragment sizes and number of fragments convenient.

Accompanying the transmit FIFO is a protect bit array 1011. Protect bit array 1011 is used to indicate whether a corresponding fragment is in use or empty. Accordingly, there are 128 bits within the protect bit array 1011, each corresponding to a fragment within the transmit FIFO. So for example if fragment 0 is in use protect bit array bit 1013 is set to 1. If fragment 5 is not in use then protect bit array bit 1015 is set to 0 indicating that fragment 5 is empty. Additionally, a read and write pointer, which points into the transmit array, is used with each connection. Therefore, 10 sets of read pointers and write pointers indicate the points where reading and writing from the transmit FIFO are taking place. Seven sets for slave devices 1 set for a connection to another master 1 set for broadcasts to active slaves and 1 set for broadcast to all slaves.

Because there are 8 possible connections, the data for each connection may be scattered in a variety of non-contiguous fragments. To string the fragments back into a contiguous transmit sequence a linked list 1003 is used. The linked list comprises an 128 element array of 7 bit values. Within each element of the array is the number of the next sequential fragment to be transmitted. Therefore, if a single connection used fragment 0, fragment 2, fragment 4 and fragment 7 of the transmit array, the linked list would have a value of 2 in the 0 field. The 2 in the 0'th field of the linked list indicates that the next fragment to be transmitted after fragment 0 would be fragment 2. linked list element 2 will have a value of 4 written into its second element indicating that the next fragment to be transmitted after fragment 2 is fragment 4. Array element 4 will have written a value of 7 into that array element indicating that after fragment 4, fragment 7 is to be transmitted. By using this 7 bit 128 element array threads linking the transmissions for each connection can be established through the transmit FIFO.

1005 is an array of 10 base pointers and 1006 is an array of 10 forward pointers, both of which are used to read data from the transmit FIFO 1001. 1007 is an array of 10 write pointers used to write data into the transmit FIFO 1007.

Figure 11:
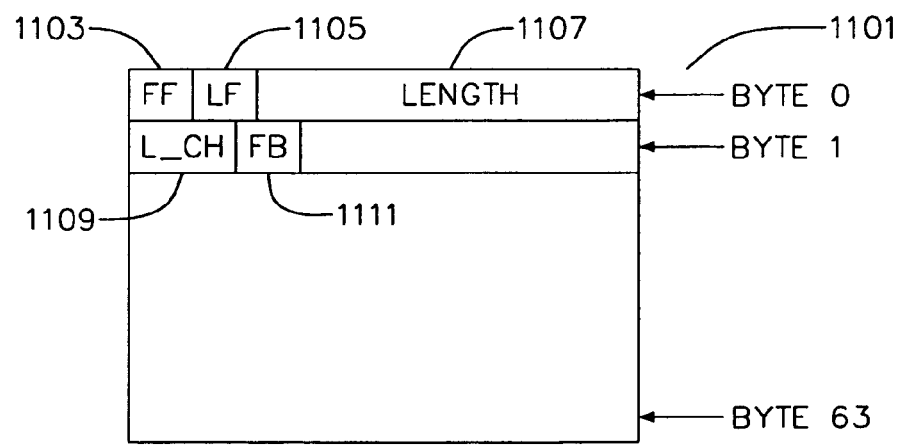
FIG. 11 is a graphical illustration of the organization of data within a fragment.

FIG. 11 is a graphical illustration of the format of data within a fragment. Each fragment 1101 has a header at byte 0 of the fragment. Within the fragment header are three fields. The first field 1103 is a 1 bit field designated FF for first fragment. The first fragment field indicates whether the fragment is the first fragment of a firmware packet (Illustrated in FIG. 12). The second field within the fragment header is the LF or last fragment field 1105. The last fragment field 1105 indicates whether the current fragment is the last fragment within a firmware packet. The remaining field, within byte 0 of the fragment header, is the length field 1107. The length field 1107 is 6 bits in length and indicates the number of bytes used within the fragment. The first fragment of a transition packet also has two more fields located within byte 1 of that fragment. The first field is the L_CH field 1109 indicating if the present packet, coincides with the beginning of an L2CAP packet. The L_CH field is 2 bits in length with a "10" indicating that the data within the fragment is actually the beginning of an L2CAP packet. A L_CH value of 01 indicates that the present fragment is a continuation of an L2CAP packet. This identification of the timing of the L2CAP packet is important because it is desirable that the packets going out over the air never straddle an L2CAP boundary. Additionally, in the second single bit field of byte 1 is a flow bit, illustrated at 1111, which is used to control the data flow to the L2CAP layer. The hardware will choose the type of Bluetooth packet to sent. The hardware uses the L_CH field to select a segment of data, to transmit in a Bluetooth packet, that does not straddle an L2CAP boundary.

Figure 12:
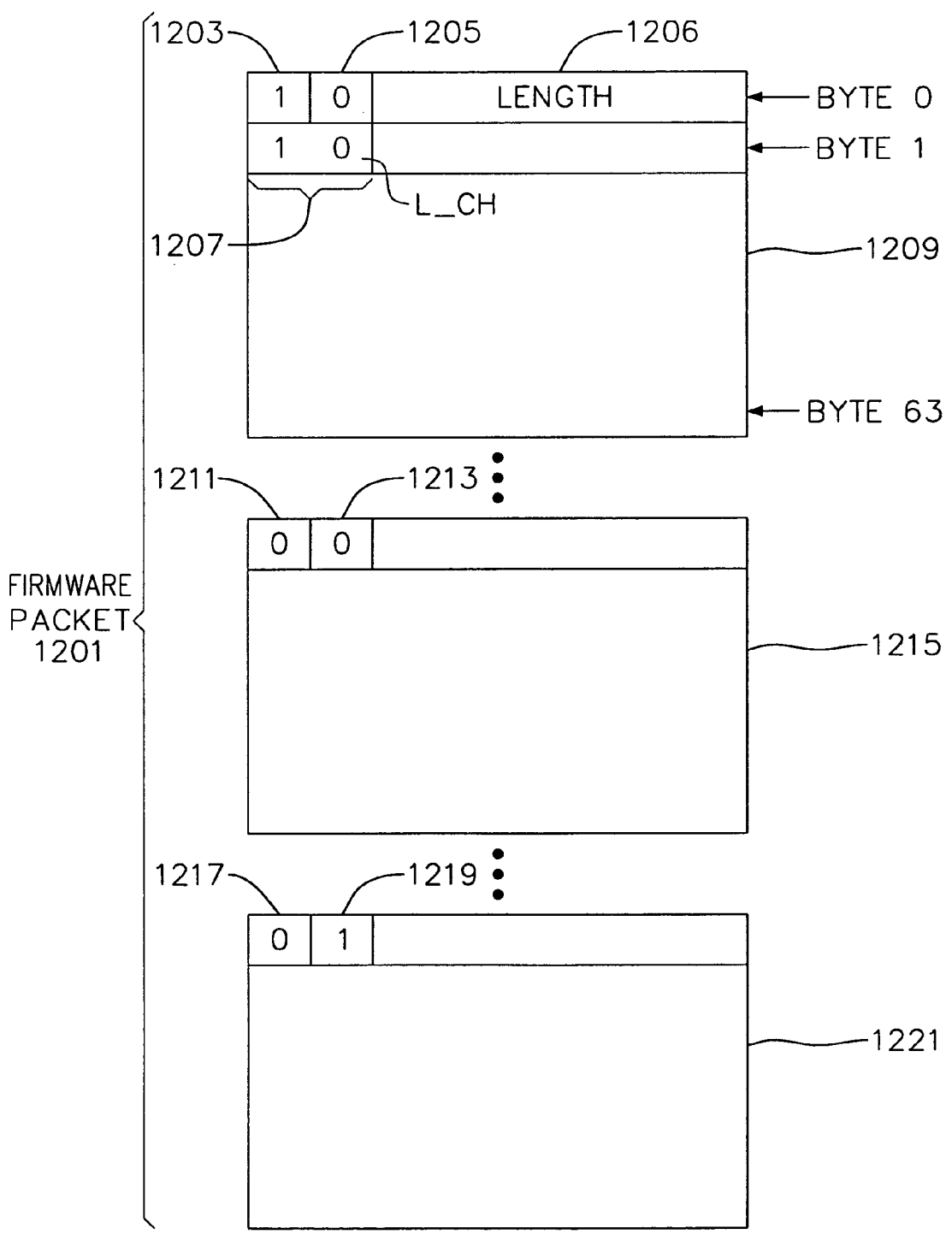
FIG. 12 is a graphical illustration of a firmware packet comprising multiple fragments.

FIG. 12 is a graphical illustration of a firmware packet. The firmware packet 1201 comprises a first packet 1209 having a header in byte 0 with a "1" bit in the first position 1203 designating that this is the first fragment of a firmware packet and a "0" in header position 1205 indicating that it is not the last fragment of the firmware packet. The remainder of byte 0 comprises a length field which gives the number of bytes used in a fragment. Byte 1 of the first fragment 1209 also has a 2 bit field because it is the first packet of a firmware packet. In the illustrated example the 2 bit field of byte 1 is set to a "10" indicating that this fragment is the beginning of a L2CAP packet.

An intermediate fragment 1215 is also illustrated. The intermediate fragment 1215 has a "0" in the first field of the header 1211 and a "0" in the second field of the header 1213 signifying that the present packet 1215 is neither the first or last fragment of the firmware packet 1201. The last fragment of firmware packet 1201 has the first bit of the header 1217 set to a "0" indicating that this is not the first fragment of a packet.

The next bit of the header 1219 is set to a "1" indicating that fragment 1221 is the last fragment within firmware packet 1201.

Figure 13:
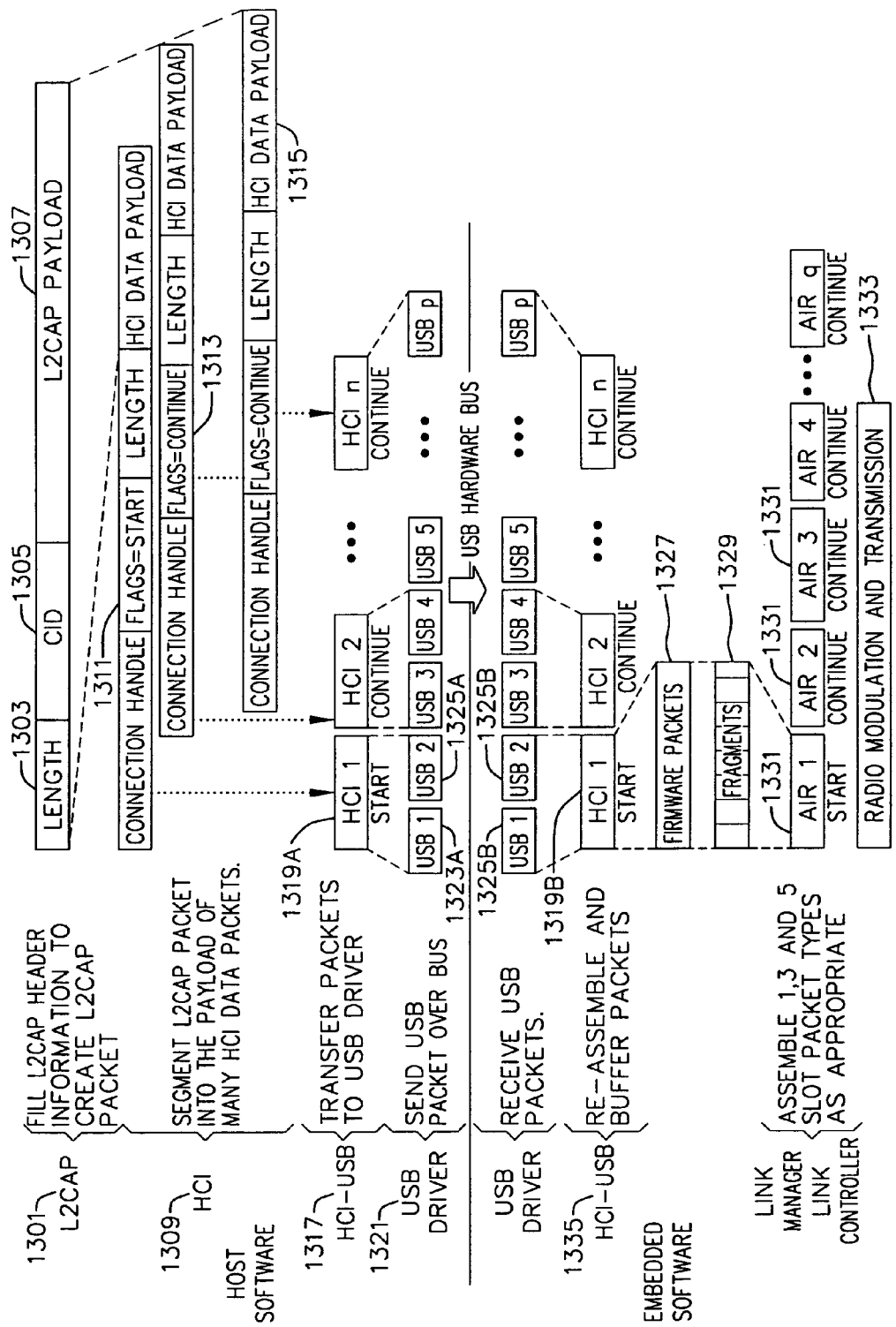
FIG. 13 is a graphical illustration showing the layering and packets within a host and Bluetooth device, illustrating layers added according to the embodiment of the invention.

FIG. 13 is a graphical illustration of the layering and packets within the host and embedded software of a Bluetooth device. The upper most layer is the L2CAP layer 1301. An L2CAP packet produced by the L2CAP layer comprises a length field 1303, a channel ID 1305 and a payload 1307. The L2CAP packets are broken down into HCI packets in the HCI layer 1309. The HCI packets have flags to indicate whether they are the beginning of an L2CAP packet 1311 or a continuation of an L2CAP packet 1313. An HCI data payload 1315 will always end concurrently with an L2CAP payload 1307 in order to insure that the HCI packet does not straddle an L2CAP boundary. Accordingly a L2CAP packet always translates into an integer number of HCI packets.

The next lower layer 1317 is indicated as a HCI-USB layer in the host. Layer 1317 transfers HCI packets to the USB driver 1321. The USB Driver layer 1321 then converts the HCI packets to USB packets and then transmits the USB packets, e.g. 1323A and 1325A, across a physical connection. The physical connection in the present examples indicated as a USB hardware bus, coupled to the Bluetooth device. The USB packets are received in a USB Driver layer. The USB packets are then reassembled into HCI packets 1319B within the Bluetooth device. The HCI packets 1319B will then be formed into the over-the-air packets 1331 which will then be sent out over the Bluetooth radio 1333. An embodiment of the present invention inserts two more layers between the HCI packet 1319B and the over the air packet 1331. The first layer inserted is the layer that takes the HCI packet and forms firmware packet 1327. The second layer is a layer that maps the firmware packets 1327 into fragments 1329 within the transmit FIFO. The hardware will then automatically choose the over-the-air packets 1331 from the transmit FIFO. The fragments belonging to each connection are treated as contiguous segments except for the marker which shows where the L2CAP boundary is. When an L2CAP boundary is encountered an optimally sized over-the-air packet that does not straddle an L2CAP boundary is selected and sent.

Figure 14:
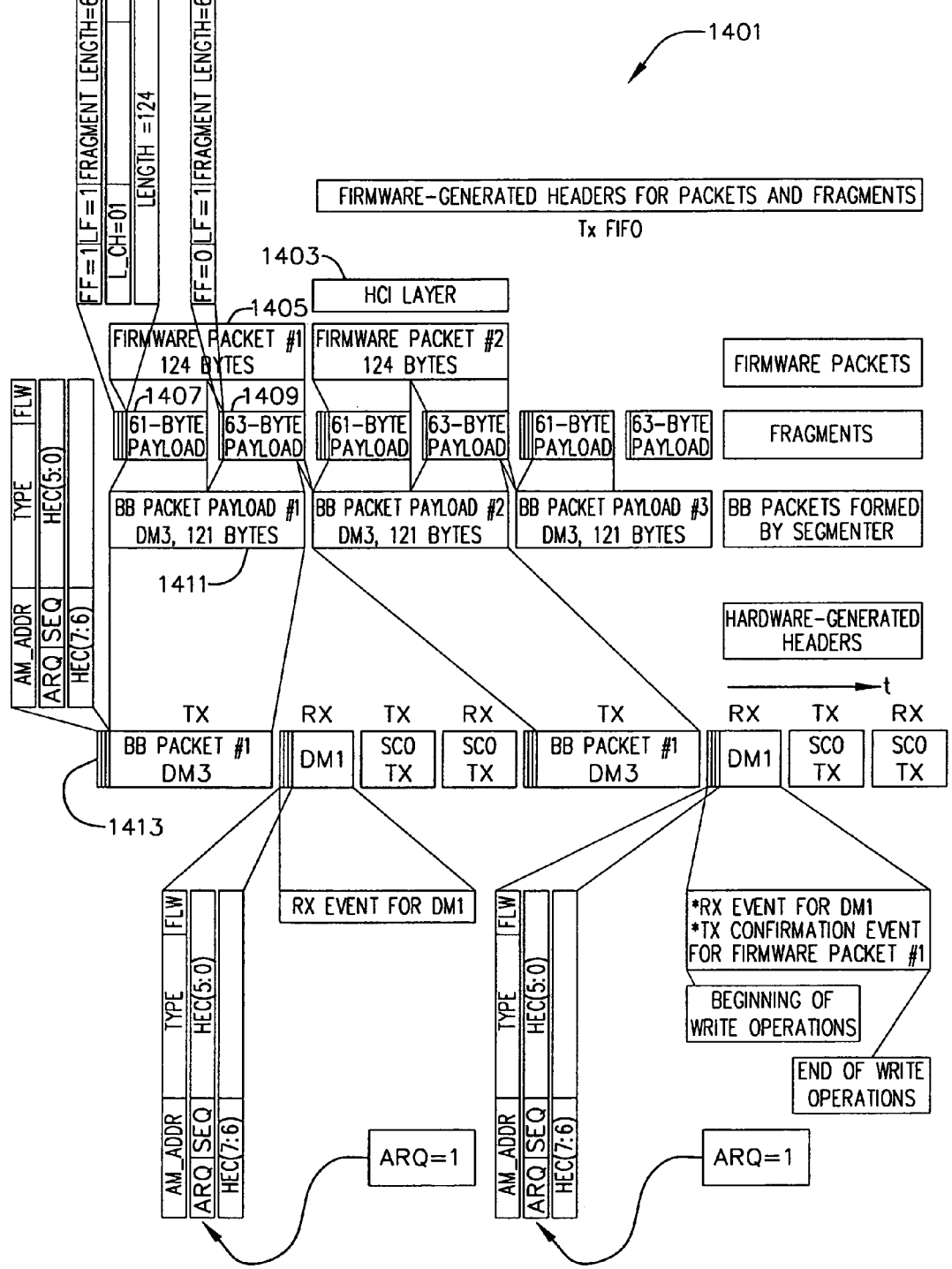
FIG. 14 is a graphical illustration of the packet structure of the added layers below the HCI layer, according to an embodiment of the invention.

FIG. 14 is a graphical illustration of the packet structure of the added layers below the HCI layers, according to an embodiment of the invention. The packets from the HCI layer 1403 are formed into firmware packets 1405. The firmware packets are further formed into 64 byte fragments 1407 and 1409 in the transmit FIFO. The fragments such as 1407 and 1409 are then concatenated by the hardware to form the over-the-air packet payloads 1411. The over-the-air packet payloads 1411 are then incorporated into over-the-air packets 1413.

Figure 15:
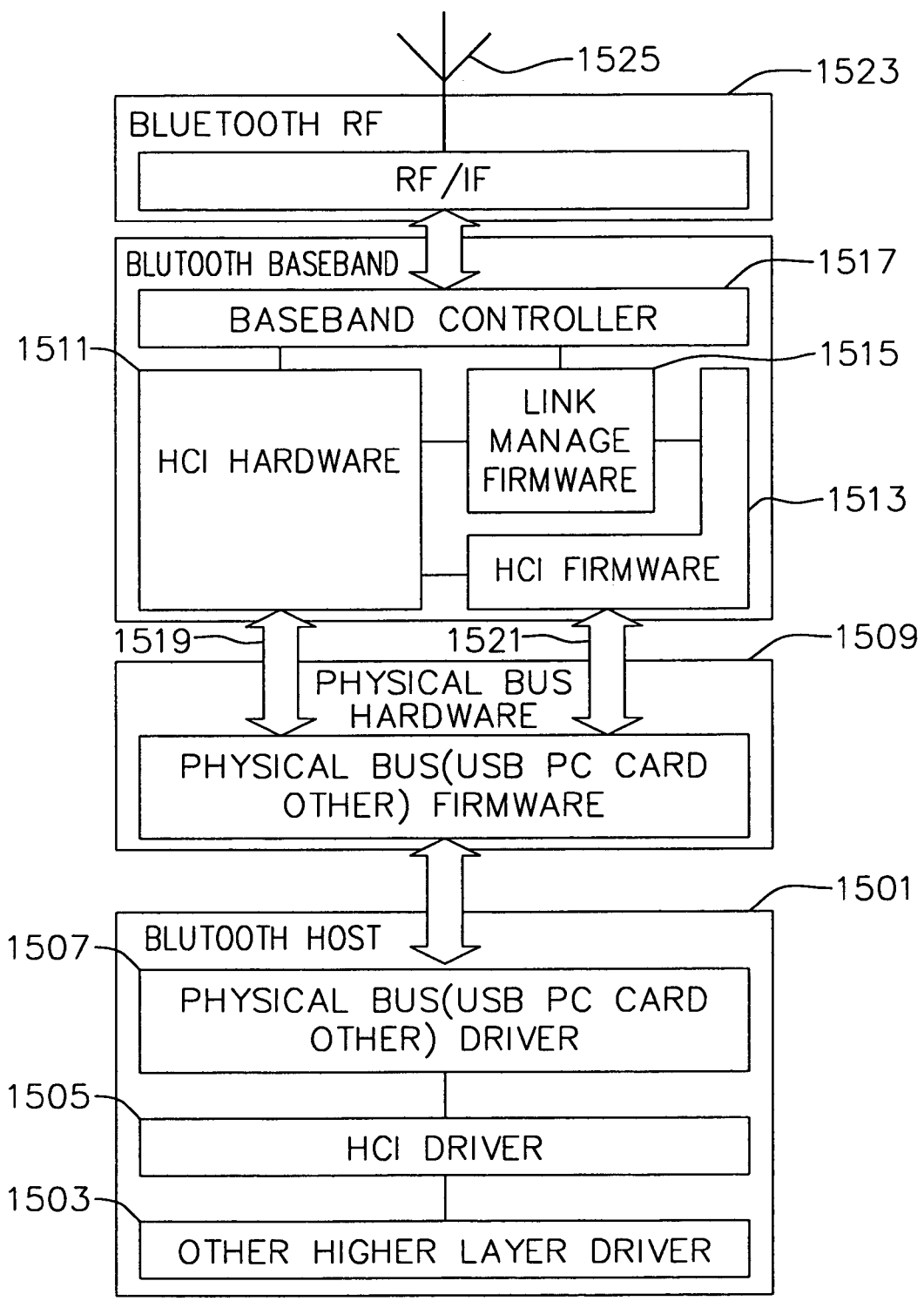
FIG. 15 is a graphical illustration of an embodiment of the invention.

FIG. 15 is a graphical illustration of an embodiment of the invention. In FIG. 15 Bluetooth host 1501 comprises three layers. The first layer 1503 is a higher layer such as the L2CAP layer. Just below the L2CAP layer 1503 is the HCI Driver layer 1505. Just below the HCI Driver layer 1505 is the physical bus 1507. The physical bus may be a variety of different type buses such as a USB, PCI bus, or another type of bus. The physical driver 1507 in the Bluetooth host then interfaces with the actual physical bus 1509. The physical bus 1509 is then coupled to the HCI firmware in the Bluetooth baseband device. Although much of the HCI firmware functionality has been transferred into HCI hardware 1511, different embodiments may choose to keep different functions within the HCI firmware 1513. In addition, some residual HCI firmware 1513 may continue to run to interface with the link manager firmware 1515. Additionally another aspect of an embodiment of the invention is the ability to switch between hardware and firmware modes of operation.

L2CAP data travels from the physical bus hardware 1509 through coupling 1519 into the HCI hardware 1511. The baseband controller block 1517 represents the physical layer. The physical layer couples the data into the Bluetooth RF (radio frequency) 1523, which in turn provides the data to an antenna 1525, which transmits the data over the air.

Figure 16:
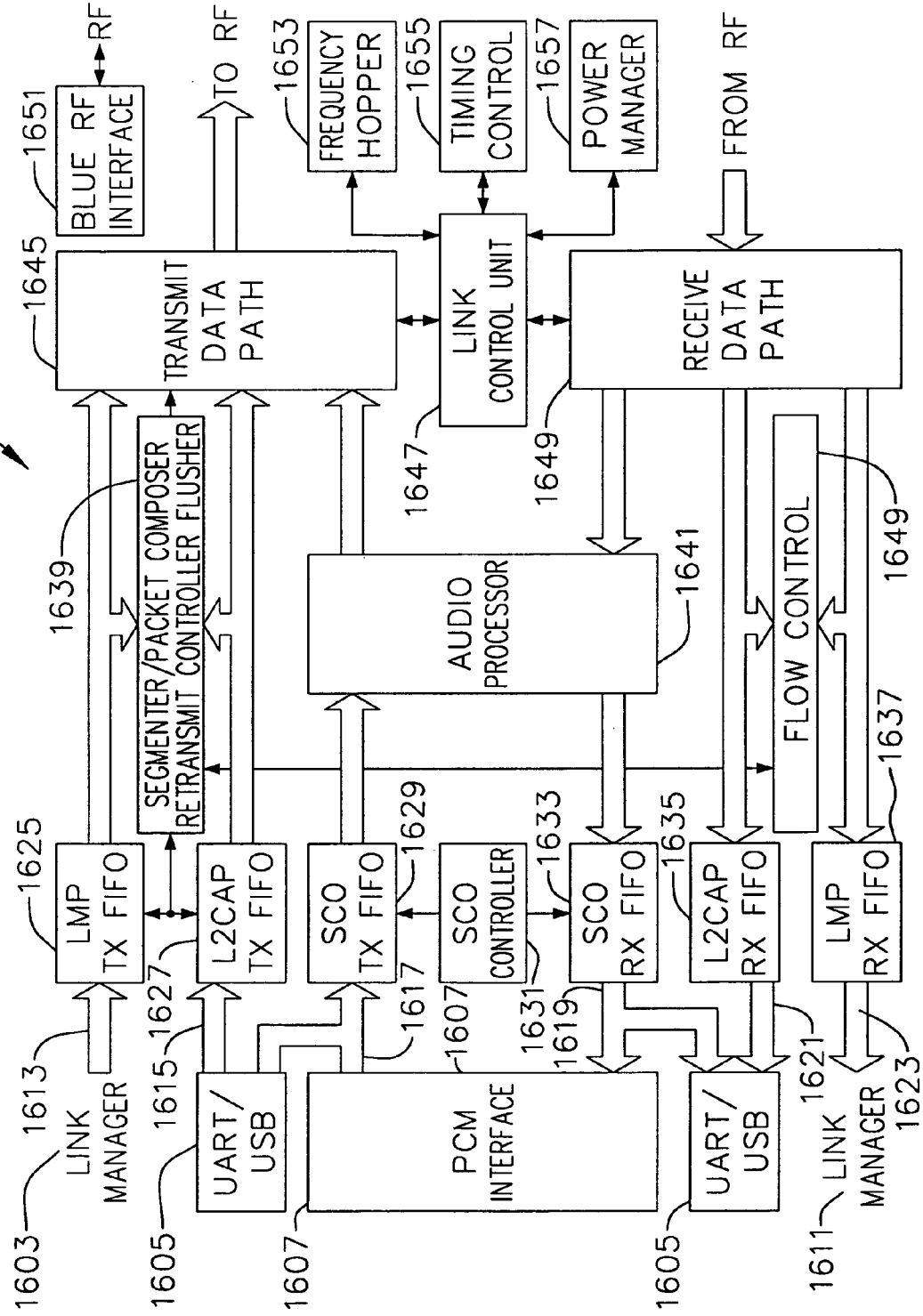
FIG. 16 is a block diagram of an exemplary baseband implementation, according to an embodiment of the invention.

FIG. 16 is a high level block diagram of an exemplary baseband implementation. 1603 and 1611 comprise the link manager, which is in firmware. UART and USB 1605 may be firmware drivers handling the USB and UART functions. In certain embodiments of the invention the USB and UART may be done in hardware, UART/USB 1605 might go directly to a UART or USB port without first going through firmware drivers. In the case where the L2CAP packets are handled in hardware UART/USB 1605 would comprise physical UART/USB transmit and receive FIFOs. 1607 is a PCM (Pulse Code Modulation) interface. The PCM interface 1607 may be an interface to a codec for example in order to handle SCO traffic. Paths 1613 and 1623 are used for LMP packet traffic, paths 1615 and 1621 are for L2CAP traffic and paths 1617 and 1619 are for the SCO traffic. The LMP transmit FIFO is illustrated at 1625. The L2CAP transmit FIFO is illustrated at 1627, and the SCO transmit FIFO is illustrated at 1629. The SCO controller 1631 controls the SCO receive and transmit, FIFOs. As well as SCO receive and transmit timing. The SCO receive FIFO is illustrated at 1633, the L2CAP receive FIFO is illustrated at 1635, and the LMP receive FIFO is illustrated at 1637. Audio processor block 1641 handles PCM, Mu-Law and A-Law voice algorithms.

The segmented/packet composer/retransmit controllers/flusher block 1639 (SCRF block) chooses the packet types to transmit over the air. The SCRF block also segments the data that's in FIFOs 1625, 1627 and 1629. The SCRF block 1639 also handles retransmission in case a transmission is not received properly. The retransmission function is an asynchronous scheme where the receiver will send back an ACK (Acknowledgment) if a transmission has been received properly. When the SCRF block gets an ACK the hardware will automatically flush the data from the transmit FIFO. If a NAK is received in response to a transmission, signifying transmission was not received properly, then the SCRF hardware will automatically handle a retransmission. The flusher is the portion of the SCRF module that flushes the data from the TX FIFO. The flushing of data from the transmit module is automatic (discussed in reference to FIG. 25), additionally, a firmware function may flush data form the TX (transmit) FIFO.

The transmit data path 1645 and receive data path 1649 modules contain DSP functions, such as forward error correction, encoding, decoding, data whitening, and an encryption engine.

Then the link control unit 1647 is a state machine which an implementation of the Bluetooth specification. The frequency hopper 1653—controls the Bluetooth specified frequency hopping sequence. The timing control block 1655 controls the Bluetooth clock. The power manager 1657 shuts off functions when they are not being used. A BlueRF Interface 1651 handles the overall system/radio interface. The flow control 1643 handles the Bluetooth data flow control automatically, which is another hardware function that can be removed from the firmware.

Figure 17:
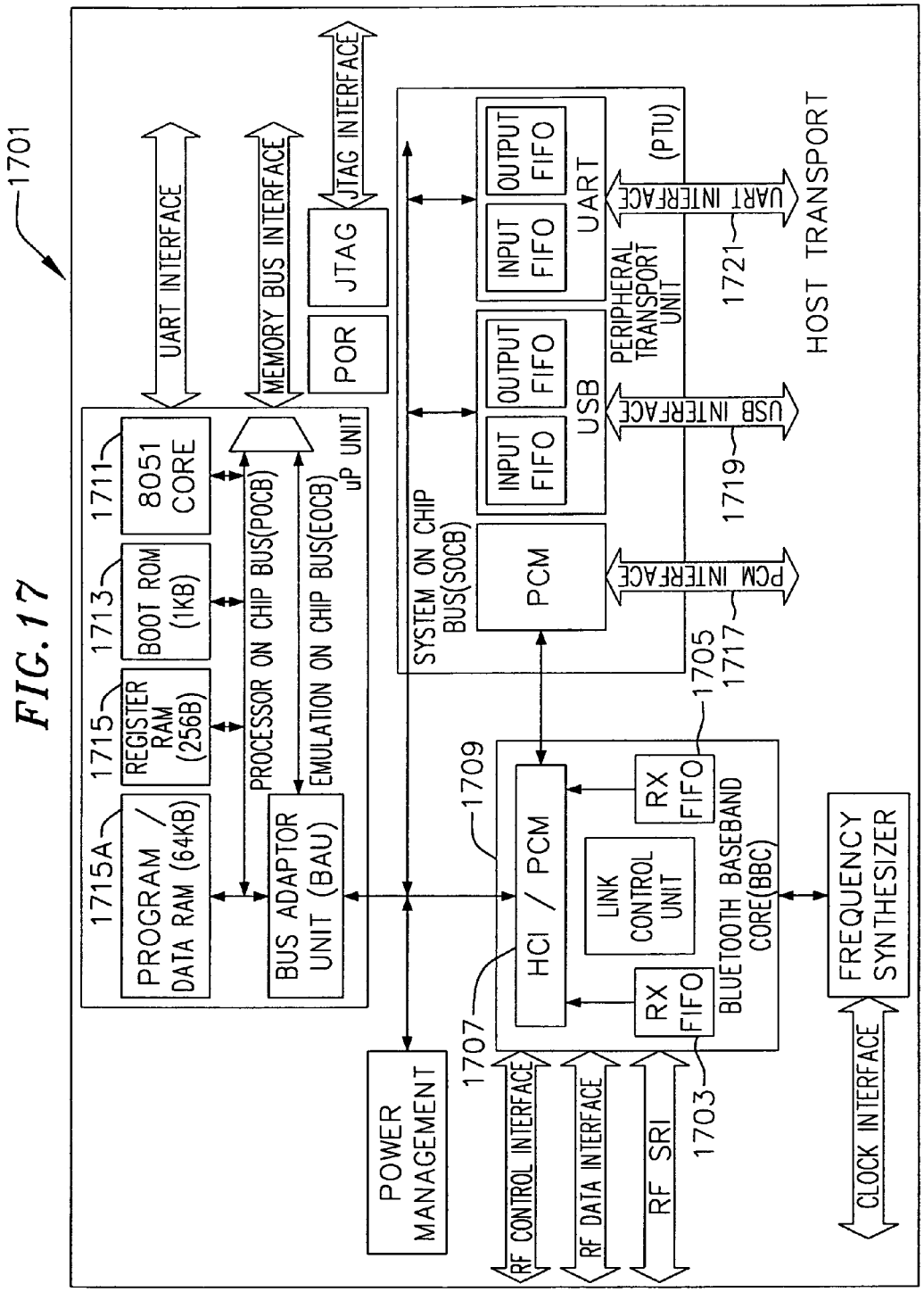
FIG. 17 is a block diagram of a Bluetooth integrated circuit, according to an embodiment of the invention.

FIG. 17 is a block diagram of an integrated circuit according to an embodiment of the invention. The embodiments of the invention are generally contained in the blocks labeled TX (transmit) FIFO 1703, RX (receive) FIFO 1705 and HCI PCM block 1707 within the Bluetooth baseband core 1709.

Some embodiments of the present invention relate, in general, to the fact that HCI functionality that is usually handled in firmware will be done in hardware. In a first embodiment of the invention, the data comes from a host and is formatted in HCI packets. Commonly, the HCI firmware will take the HCI packets and then form firmware packets and then form 64 byte fragments and write them into the appropriate FIFO.

In the first embodiment of the current invention the forming of HCI packets into fragments is done in hardware. Hardware receives the HCI packets and then forms the firmware packets and the 64 byte fragment formats itself automatically.

A second embodiment of the invention is similar to the first embodiment except that the data flow is in the opposite direction. Instead of taking HCI packets from the host, in the second embodiment, over-the-air packets are received and then HCI packets that will go to the host are formed.

In a third embodiment of the invention, hardware automatically transmits HCI_Number_Of_Completed_Packets to the host. these events indicate how much buffer space in the Bluetooth device has been made available by data in the buffer having been transmitted and acknowledged, or otherwise flushed.

In a fourth embodiment of the invention, hardware automatically receives the HCI_Host_Number_Of_Completed_Packets command from the host telling the Bluetooth device how much buffer space in the host has been freed since the last such command, so that the Bluetooth device doesn't send too much data to the host.

An important aspect of embodiments 1 through 4 is that no intervention from firmware is required.

In a fifth embodiment of the invention, the first through fourth embodiments are present. In addition, the firmware counterparts are present. The functions present in the first through fourth embodiments can be switch between hardware and firmware. Such switching ability may be used by Bluetooth system designers to save power, increase speed or a variety of other reasons.

In a sixth embodiment of the invention, the hardware has the ability to automatically set or clear the standard Bluetooth control flow bits of FLOW, ARQN and SEQN of transmitted Bluetooth packets based on the flow control bits of received packets, on RX FIFO status, and on various error checks in the physical data path such as FEC (Forward Error Correction) and CRC (cyclic redundancy check).

In a seventh embodiment of the invention the ability to automatically choose the Bluetooth packet type and length for transmission is incorporated in the hardware. An advantage of the seventh embodiment is that by pooling the fragments in the memory, if there are less than seven slaves, then the slaves that are present are free to use the whole memory. In addition, memory space may be dynamically allocated to each connection according to Bluetooth specified quality of service. For example, a connection may have a parameter indicating the maximum amount of quiet time that is allowed before more data must be sent.

Each connection might have a different value for quality of service and accordingly, the proposed FIFO structure allows for variable memory allocation to each connection. In an eighth embodiment of the invention, the SCO frame are automatically scheduled in hardware.

Another advantage of embodiments of the invention is that it makes the calculation of the HCI_Number_Of_Completed_Packet events easier to calculate. The HCI layer tells the host how many HCI packets have been completed (flushed from the transmit FIFO). An embodiment of the invention maps HCI packets to firmware packets one to one. The number of completed HCI packet is equal to the number of flushed firmware packets. Therefore the embodiment need only count firmware packets. As it is flushing fragments from the FIFO to determine the number of completed HCI packets. So now its easy for hardware to inform the HCI layer what free buffer space is available to send packets to the host. An additional advantage is that the L2CAP and LMP buffers are separated. The LMP buffer is accessed by firmware. The LMP buffer is generally not accessed by hardware. The L2CAP FIFO accesses may be by firmware or hardware depending on which mode the system is operating in. If the HCI is being done in firmware then the firmware will be accessing the L2CAP FIFO and if the HCI function is implemented in hardware, then hardware will be accessing it the L2CAP FIFO. Since LMP lies in firmware, by separating the LMP and L2CAP functions firmware never has to access the L2CAP FIFO. Firmware can access the LMP FIFO whenever necessary.

Another advantage in embodiments of the invention is that sometimes it is necessary to flush data from a FIFO. If it was desired to flush an L2CAP packet out of the FIFO but not and LMP packet it would be difficult if both packets were in the same FIFO. In essence, L2CAP packets can be flushed without touching the LMP packets.

Figure 18:
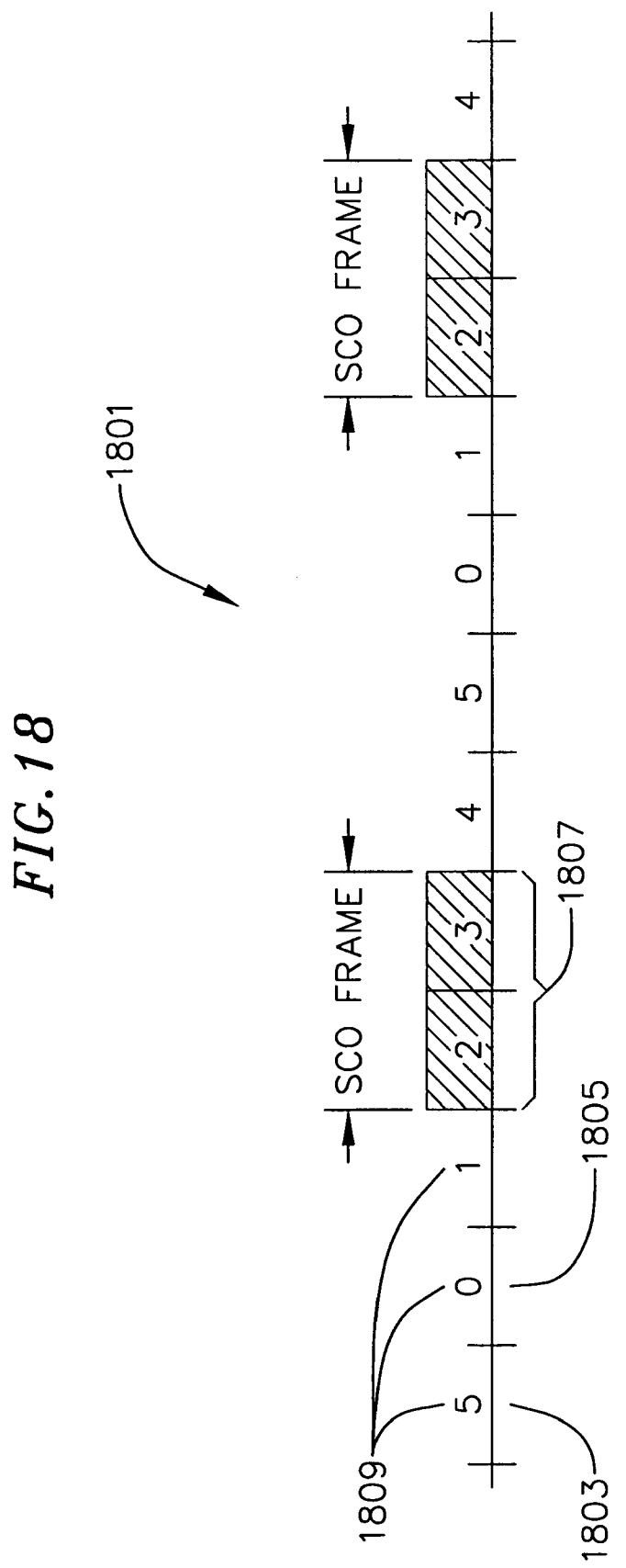
FIG. 18 is a graphical illustration of piconet traffic on a single piconet, which has an SCO connection with a period of 6.

FIG. 18 is a graphical illustration of packet traffic on a piconet, which has an SCO connection with a period of six (T=6). In addition to SCO transmissions certain types of ACL transmissions may also have periodic behavior, and as such the following discussion is pertinent to them as well as to SCO transmissions. A slot counter counts in sync with the Bluetooth slot clock. In the present example, FIG. 18 illustrates a counter for an SCO connection with the T=6 and D=2. FIG. 18 illustrates a slot clock with a period of 6 slots (e.g. 1809), which are numbered from 0 to 5 corresponding to the slot counter. For example, slot 1803 is numbered 5 and slot 1805 is numbered 0. The slot counter will count from 0 to T−1(=5). The SCO slots occur when the slot counter=2 and 3 since D=2. The counter then counts 4, 5, 0, 1 and 2.

The Bluetooth specification indicates that in order to initialize the slot counter the Bluetooth counter is taken modulo T. Accordingly, whatever the Bluetooth clock is equal, that number is taken modulo 6 and the result is the initial counter value. In the present case if the period is 6 then the Bluetooth clock modulo 6 yields the slot counter value. If the period of the periodic transmission is N, then the Bluetooth clock modulo N is equal to the slot counter.

In a eighth embodiment of the invention, a hardware circuit for computing the value of the Bluetooth clock (or any number) modulo N is described. The Bluetooth specification is somewhat more specific. There are actually two cases. In the first case, if the most significant bit (MSB) of the Bluetooth clock is 1 it is inverted prior to doing the modulo calculation. If the Bluetooth clock MSB is 0, the modulo calculation proceeds as is and the result is then the slot counter value. So ultimately, a 27 bit value which is the Bluetooth clock with the MSB either inverted or not is taken modulo the period (in the present example 6) and the result is the initial slot counter value.

When the slot counter, which is used for Slot Gauge, is initialized, a modulo divide operation is performed. The Bluetooth clock is modulo divided by a number T, which represents the period of a scheduled periodic transmission, which forms the bounds for the transmission of other packets. There are other functions within a Bluetooth system that may use a similar modulo divide of the Bluetooth clock. A further embodiment of the invention comprises a circuit and method for providing a modulo divide operation, exemplarily of the Bluetooth clock.

Figure 22:
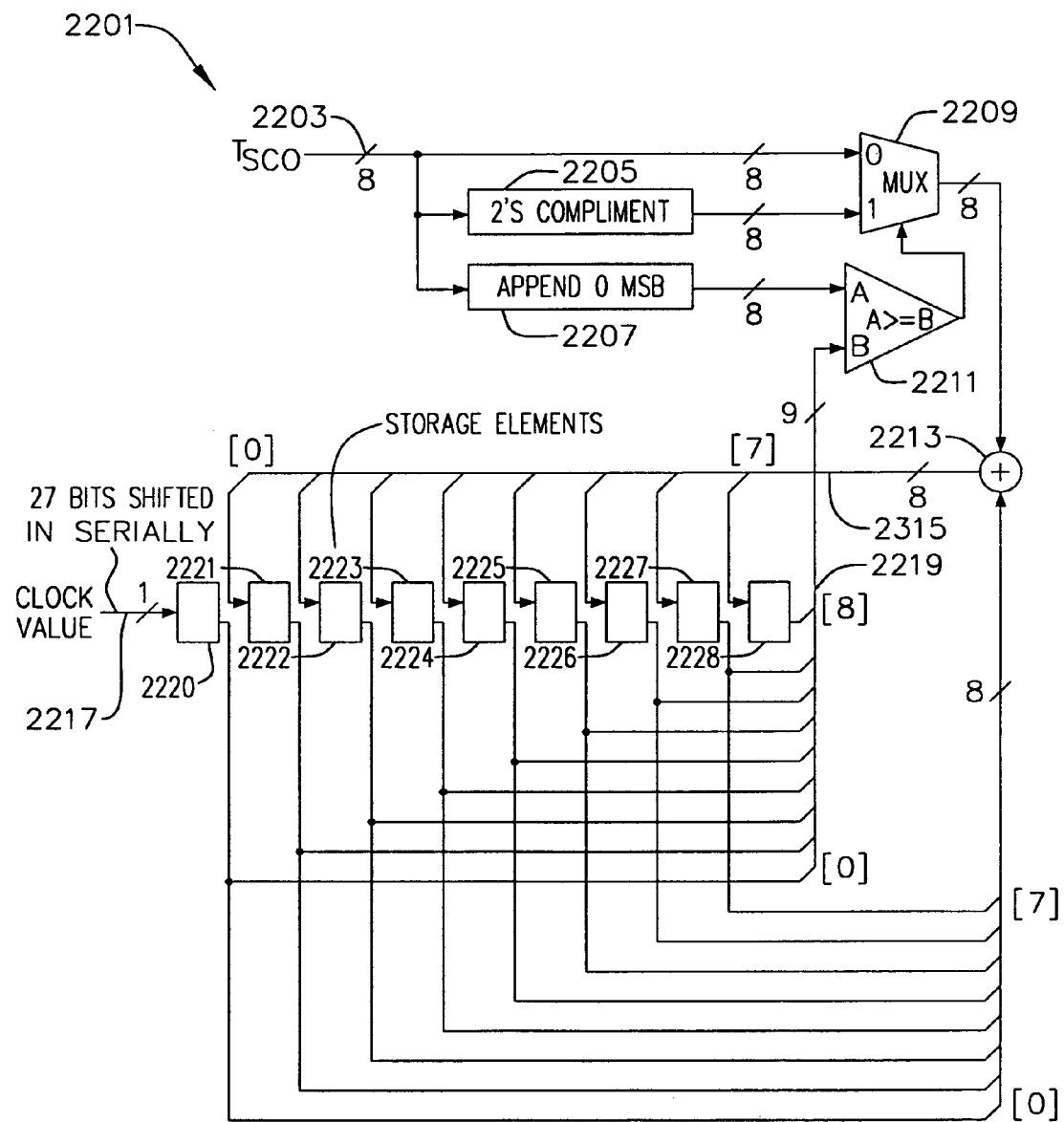
FIG. 22 is a schematic diagram used to provide a modulo divide of the 27 bit Bluetooth clock by "T", an 8 bit number, according to an embodiment of the invention.

FIG. 22 is a schematic diagram used to provide a modulo divide of the 27 bit Bluetooth clock by "T", an 8 bit number. In FIG. 22 the 27 bit T value of the Bluetooth clock is serially shifted into flip-flop 2220 one bit at a time MSB (most significant bit) first. The output of flip flops 2220 through 2128 form a 9 bit bus 2219, with flip flop 2228 comprising the MSB and flip flop 2220 comprising the LSB. The 9 bit value of bus 2219 is provided to the "B" input of comparator 2211. The modulo divisor is provided to the circuit on 8 bit bus 2203. The 8 bit value provided by bus 2203 represents the modulo divide value "T". An additional "0" bit is concatenated to the MSB of the value of "T" appearing on bus 2203, producing a 9 bit value of "T". The 9 bit value of "T" is coupled into the "A" input of comparator 2211. If the value of the 9 bit value of "T" is greater than or equal to the value on the 9 bit bus 2219 then the output of comparator 2211 controls a multiplexer 2209. If the multiplexor's 2209) control signal i.e., the comparator 2211 output, is a "1" then a two's compliment (2205) value of "T" is provided to summation unit 2213. If the output of comparator 2209 is a "0" then the 8 bit value of "T" is provided to summation unit 2213. Summation unit 2213 is also provided an input from the output of flip flops 2220 through 2227. The output of the summation unit 2213 is then coupled into the inputs of flip flops 2221 through 2228. Once the circuit has run for 27 clock cycles the answer for the modulo divide appears at that output of flip flops 2220 through 2228. This method may be extended to any modulo calculation. This method will produce an answer in a number of clock cycles equal to the number of bits in the dividend of the modulo divide.

Figure 23:
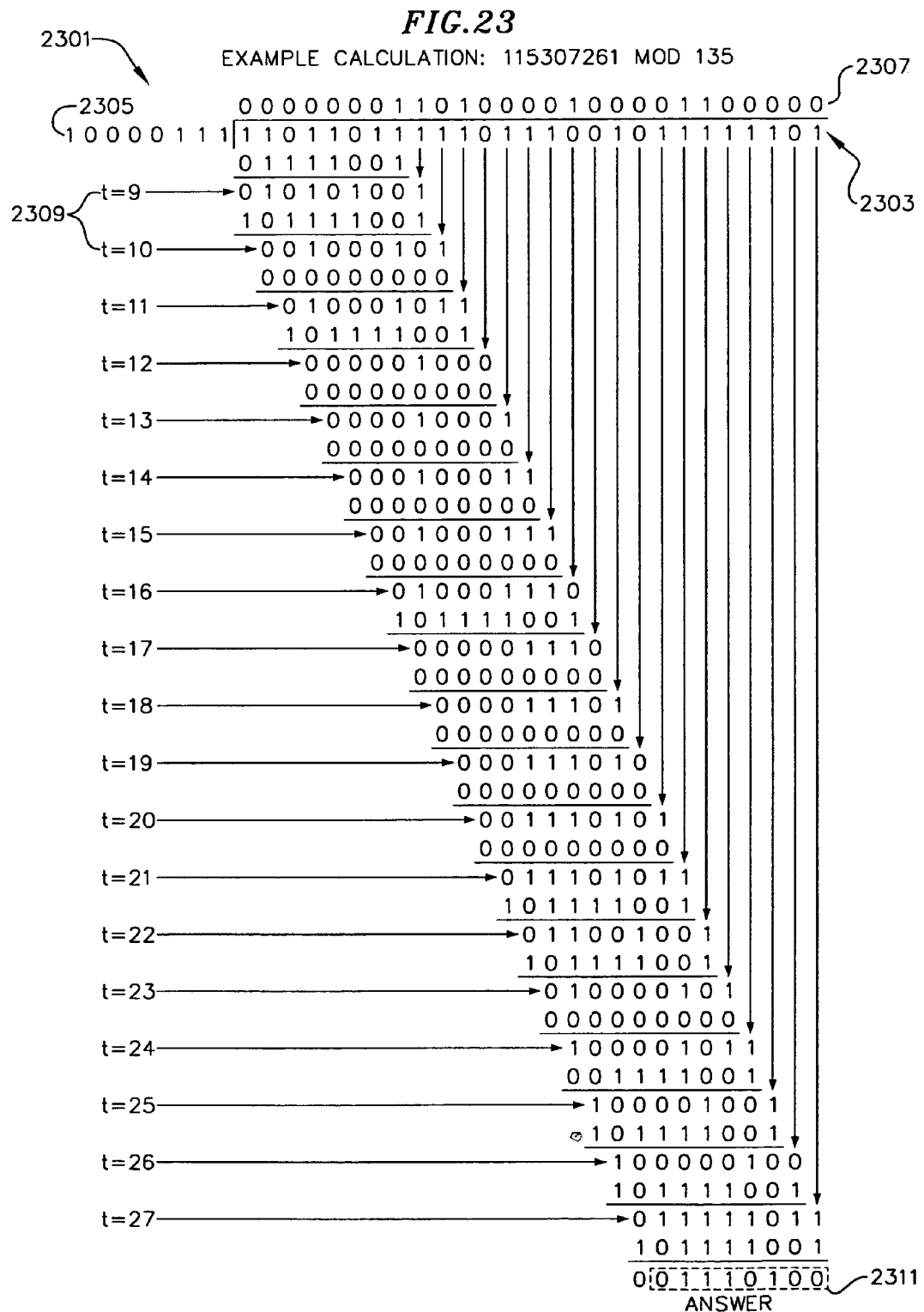
FIG. 23 is a graphical illustration of the computational values generated in an exemplary 115,307,261 mod 135.

FIG. 23 is a graphical illustration of the computational values to do an exemplary 115,307,261 mod 135. Value 2303 represents 115,207,261 in binary. Value 2305 represents the value of the dividend 135. The intermediate values produced at the different clock times is represented for clock time (t)=9 through 27. The intermediate values represent the outputs of flip flops 2220 through 2228 in FIG. 22, the answer is produced at 2311.

The modulo divide may be used by Slot Gauge for SCO transmissions or for any other types of periodic transmissions, such as Beacons and Sniffs. Bluetooth mechanism which require regular periodic transmissions. Such as SCOs. Bluetooth has a Beacon which is used when a slave is temporarily put out of action. This mode is called park mode. The master periodically broadcasts a beacon to the parked slaves. The slaves can use the beacon to determine when to wake up. The beacon is analogous to an SCO channel because it broadcasts with a fixed period. Sniff slots are also periodic. So SCO, beacon and sniff are three Bluetooth functions that may use a Slot Gauge circuit having a modulo divide. Beacon and sniff would require 16 bit divisor quantities instead of just 8, which could be accommodated in the circuit of FIG. 22 by adding flip flops to the flip flop chain 2220 through 2228 and enlarging the bus paths and circuit elements by 8 bits.

The description of the hardware circuits may be implemented in a variety of ways in the present embodiment they were written into Verilog RTL and then the Verilog synthesizer maps them into gates.

Ninth embodiment of the invention comprises an auto segmenter. There are three pieces of information that the hardware needs in order to automatically segment the data into the over-the-air packets. The first piece of the information needed is how many slots are available. For example, if there is any SCO connection with a period of six, it uses two slots out of every 6 for SCO transmission. Accordingly, to auto segment data the number of free slots must be determined. The second piece of information is what types of packets are allowed. The third piece of information that must be determined is how much data there is in a transmit buffer to send. The hardware needs to know all three pieces of information in order to choose a packet type. Those skilled in the art will require that the described auto-segmenter may be realized in other technologies such as firmware or a combination of hardware and firmware.

The function of the "Slot Gauge" mechanism is to tell the hardware how many slots are available to transmit or receive packets between periodic transmissions, such as an SCO transmission. The Slot Gauge informs the hardware how many contiguous slots are currently available in the active piconet. The computation of available slots is complicated by the fact that if two piconets are active you might have Bluetooth clocks that are skewed from one another. In the case that the Bluetooth clocks from the two piconets are not in phase synchronization, the phase relationship of the two piconets needs to be accounted for in order to figure out how many slots are available.

Figure 19A:
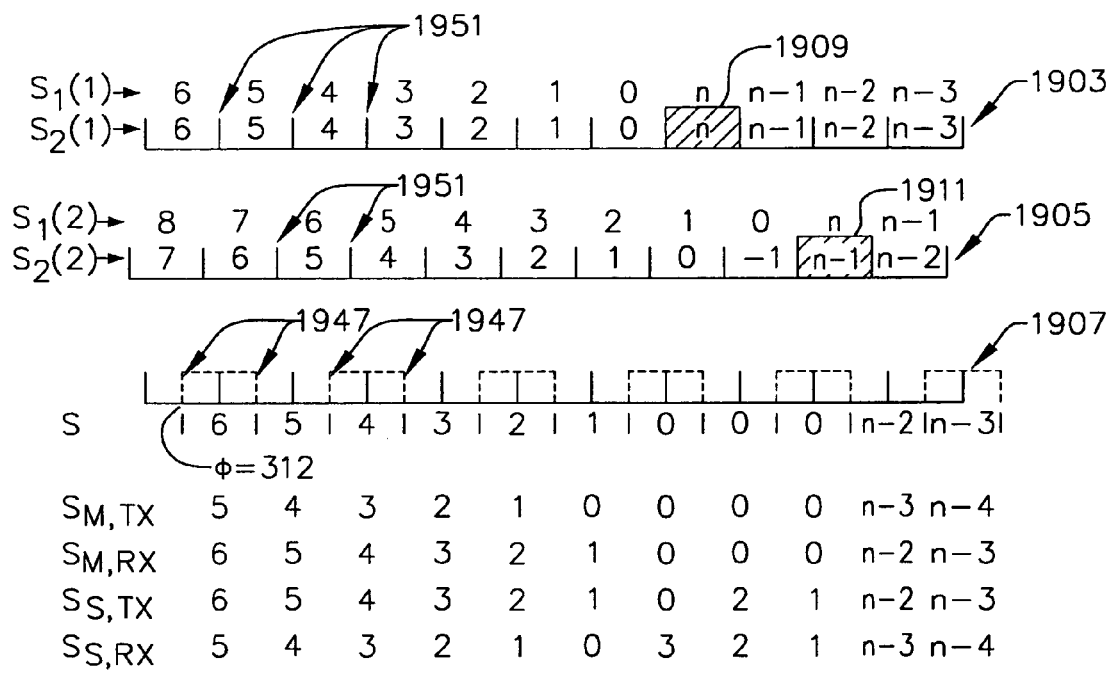
FIG. 19A a is graphical illustration of unsynchronized piconets.

FIG. 19A a is graphical illustration of unsynchronized piconets. In FIG. 19A three separate piconets 1903, 1905, and 1907 are illustrated. Each piconet has its own timing. Piconet 1907 represents the active piconet. The phase of piconet 1907 is different from the phase of piconet 1903 and piconet 1905. Piconet 1903 has a slot 1909 which is scheduled, and piconet 1905 has a slot 1911 that is scheduled.

Figure 19B:
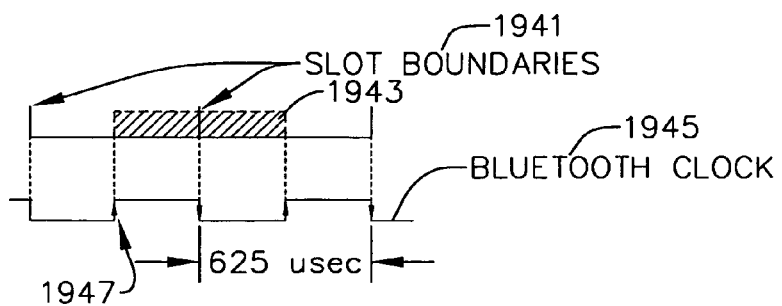
FIG. 19B is a graphical illustration of the timing of the "Slot Gauge.

FIG. 19B is a graphical illustration of the timing of the "Slot Gauge." The following description of "Slot Gauge" describes a hardware implementation. Those skilled in the art will recognize the other implementations may be accomplished in software, firmware, or can comprise a combination of techniques. The Slot Gauge output updates on the rising edge of Bluetooth clock bit 0, for example 1947, of the currently active piconet, and is stable for 625 µsec, which is equal to one slot period. There are four values provided by Slot Gauge that are required in order to determine how many slots are available for transmission or reception of data.

The first value, $S_{M,TX}$, represents the number of slots available for transmission for a master. The value for $S_{M,TX}$ will be used by a hardware packet segmenter to decide which type of data packet to use for transmission. For example, if all packet types are allowed and $S_{M,TX}$ is 5 or greater then any packet type may be used. If $S_{M,TX}$ is less than 5, DM5 and DH5 packets may not be used. If $S_{M,TX}$ is less than 3, neither DM5, DH5, DM3, nor DH3 packets will be allowed.

The second value, $S_{M,RX}$, represents the number of slots available for reception by a master. $S_{M,RX}$ is equal to the number of available slots, including the current slot, available for packet reception. $S_{M,RX}$ is used by the receive hardware. The receiver hardware decoders the TYPE field in the received packet header, and if the packet requires more than $S_{M,RX}$ slots, packet reception is aborted.

The third value, $S_{S,TX}$, represents the number of slots available for transmission by a slave type device. $S_{S,TX}$ has the same use as $S_{M,TX}$. Since a device may be both a master and a slave both $S_{M,TX}$ and $S_{S,TX}$ values may be needed by a device.

The fourth value, $S_{S,RX}$, represents the number of packets available for reception by a slave. $S_{S,RX}$ has the same us as $S_{M,RX}$. Since a device may be both a master and a slave both $S_{M,RX}$ and $S_{S,RX}$ may be needed by a device.

The Slot Gauge algorithm assumes that each isochronous channel (SCO, sniff, or beacon) is controlled by a dedicated counter called $C_1$ that counts from 0 to $T_i-1$ is the period in slot clocks, with the frame beginning when $C_i = D_i$. Furthermore, $C_1$ is aligned with the piconet clock for the piconet using this counter in the sense that $C_i$ increments on every falling edge of Bluetooth clock bit 0 (every whole slot boundary). Slot Gauge computations are performed on a snapshot of the state of the inputs at the rising edge of Bluetooth clock bit 0. The following steps describe the Slot Gauge algorithm. It should be noted that $S_1(i)$ can be computed other ways if $C(i)$ is not available. For example, it could be calculated by subtracting the current Bluetooth clock in P(i) from the Bluetooth clock value where periodic transmission will occur (e.g., 1909 and 1911). Alternative, C(i) could be replaced with a down-counter. This down-counter would effectively be equal to $S_1(i)$.

1. Determine how many whole slots, $S_1(i)$, there are before C(i) reaches D(i). $S_1(i)$ is the number of whole slots in the piconet clock with which C(i) is aligned.

| | |
|---|---|
| $S_1(i) = D(i) - C(i) + T(i) - 1$ | if $C(i) >= D(i)$ |
| $S_1(i) = D(i) - C(i) - 1$ | if $C(i) <= D(i)$ |

2. Determine the 1 MHz phase (with respect to the beginning of a slot) phase [P(C(i))], of the piconet clock with which C(i) is aligned, and the 1 MHz phase of the active piconet 1907, phase [$P_{active}$]. The phase has a resolution of 1 μsec, $0 <= P <= 624$.

3. Put $S_1^{(i)}$ (e.g. 1955) in terms of slots on piconet $P_{active}$ 1907.

$S_2^{(i)}$ (e.g. 1953) = $S_1^{(i)} - $(phase [$P_{active}$])

where (phase [P(C(i))]>(phase [$P_{active}$]) is an element of $\{0, 1\}$ where 0=false, 1=true. If phase [P(C(i))]>phase [$P_{active}$], then $s_1^{(i)}$, takes values in the range [$-1, T(i)-2$]. Otherwise it will take values in the rant [0, T(i)-1].

4. Negative numbers are set to zero as shown below.

| | |
|---|---|
| $S_3^{(i)} = 0$ | if $S_2^{(i)} < 0$ |
| $S_3^{(i)} = S_2^{(i)}$ | otherwise |

5. The number of slots available in $P_{active}$ is the minimum of $S_3^{(i)}$ for all values of S=min ($S_i^3$) for all i S=min ($S_3(i)$) for all i.

Accordingly in 1903 $S_3(i) = S_2(i)$ and in 1905 $S_3(2) = S_2(2)$ =1 then $S_2(2)=0$ 6. The Slot Gauge value is modified according to whether the device is a master or a slave, and whether availability for RX or TX packets is needed. If the device is a transmitting master, one slot is subtracted from the Slot Gauge output to allow for a one slot reply from the slave. If the device is a receiving slave, one slot is subtracted from the Slot Gauge output to again allow for at least a one slot reply. If the subtraction of one from the Slot Gauge value results in a negative number, 0 is used instead of the negative number. All negative results are set to zero.

| Master: | |
|---|---|
| $S_{M,TX} = 0$ | if $S - 1 < 0$ |
| $S_{M,TX} = S - 1$ | otherwise |
| $S_{M,RX} = S$ | |

| -continued | |
|---|---|
| Slave: | |
| $S_{S,TX} = S$ | |
| $S_{S,RX} = 0$ | if $S - 1 < 0$ |
| $S_{S,RX} = S - 1$ | otherwise |

The second piece of information that the transmit hardware auto segmenter needs in order to choose the packet type and length is the number of bytes of data available in the transmit FIFO to be transmitted. The number of bytes of data available to be transmitted may be determined by counting the bytes in the transmit FIFO.

The Byte Gauge will determine how many bytes are in the transmit FIFO for a particular connection transmission. Byte Gauge determines the number of bytes using a pointer which sequences through the fragments for the particular connection transmission. Byte Gauge assumes one connection is active and Byte Gauge takes the current read pointer for that connection and sequences through the fragments until it hits the write pointer, all the while totaling up the bytes encountered. In other words the Byte Gauge is going to take where the read pointer is at and figure out how many bytes there are. The totaling process stops when it hits the write pointer, but other events may stop the totaling of the bytes also. There are other events that may stop the totaling of bytes by the Byte Gauge. For example Byte Gauge will terminate the totaling if it hits an L2CAP boundary. L2CAP boundaries are marked within the fragments as discussed earlier.

The Byte Gauge will stop totaling at a L2CAP boundary, it won't try to got any further because the transmission cannot straddle a L2CAP boundary. Additionally the Byte Gauge will stop counting once it counts 339 bytes because the largest possible packet that can be transmitted is 339 bytes, the there is no reason to count any further than 339. So the Byte Gauge stops counting when it encounters the write pointer, an L2CAP boundary, or when it counts 339 bytes, whichever comes first. The Byte Gauge is a quick algorithm because each of the fragments has a length field. So assuming Byte Gauge knows where the read pointer is, and knows the length of the fragment it can very easily jump, in few clock cycles, from fragment to fragment and add the number of bytes.

So the Byte Gauge process starts out at 2503 when the base pointer Bptr is loaded into the temporary pointer Tptr and the accumulator ACC is set to 0. In step 2507 a flag, telling Byte Gauge whether at least 1 byte has been written in the transmit FIFO. Assuming there has been a byte written Byte Gauge checks in step 2505 to see if Tptr is residing at the beginning of a fragment. If Tptr is at the beginning of a fragment control is transferred to step 2519. If the temporary pointer is not pointing to the beginning of a fragment control is transferred to 2511 where the write pointer bits MSB through 6 are checked to see if they are equal to the temporary pointer. This checking is to see if the write pointer is in the current fragment. If the write pointer is in the current fragment then control is transferred to 2513 and the process terminates in block 2537. If the Wptr is not in the current fragment then the dcnt is added to the accumulator. The down-count is the number of bytes left in that fragment. Control then passes to 2517 where the Tptr is loaded with the value of the Lptr. Next in 2519, the FF, LF and then the length field is read from the header fragment. And then in block 2521, FF is checked to see if FF=1. If FF=1, then in 2523 the write pointer is check to see if its equal to the temporary pointer. If the Wptr is not, equal to the temporary pointer then in 2525 subtract one from the length because if this is the first fragment. If FLEN equals 1 then that means that are actually two header bytes instead of just one. In 2531, the L_CH field is checked. If the L_CH field is "10" we are going to stop in 2531 because "10 means the starting the L2CAP otherwise control is transferred to 2533 to check again to see if the Wptr is in the current fragment. If it is in the current fragment, then the Wptr minus the Tptr will be added to the accumulator and then the process stops in 2537. Otherwise if Wptr does not equal Tptr then FLEN is added to the accumulator and control is transferred to 2541 to check to see if the accumulator is 339. If the ACC is not equal to 339 control is transferred to block 2517, otherwise if the ACC does not equal 339 the process stops.

Another facet of embodiments of the invention is that the system firmware may mask off certain packet types any way it wants to. For example, perhaps because of the quality of service desired it may be necessary to transmit only packets having error correction.

Once the 3 necessary pieces of information are determined, the transmit packet type an length may be selected using the following packet type/length selection rules.

---
Packet Type/Length Selection
--- a) The first priority is to transmit as many bytes in the buffer as possible. If there are more bytes than the largest allowed type, then the allowed type that can hold the most bytes is chosen, regardless of whether it has encoding or not.
   Example: DM1, DM3, DHi, DH3 allowed, bytes available = 122. DH3 is chosen.

b) The smallest packet that is big enough for the number of bytes available is chosen.
   Example: DH1, DH3, DH5 allowed, bytes available = 128. DH3 is chosen.

c) If packet types with encoding and types without encoding are both allowed, and either kind is big enough to hold the number of bytes available for transmission, the type with encoding is chosen, as long as it is the smallest possible packet in terms of number of slots. If the smallest possible packet type is not a type with encoding, a type without encoding is chosen.
   Example 1: DM1, DM3, DH1, DH3 allowed, bytes available = 64. DM3 is chosen
   Example 2: DM1, DM3, DH1, DH3 allowed, bytes available = 25. DH1 is chosen.

---

FIG. 20 is a table relating the number of bytes to be transmitted to the packet type priority. For example, if there is between 1 and 17 bytes in the buffer, the first choice is a DM1 type packet. The second choice is a DH1 type packet. The reason is these packets are chose is that the DM 1 packet may hold up to 17 bytes, the DH 1 packet type may hold up to 27. The DM1 packet also contains forward error correction so it holds less data but both are one slot. So by choosing a DM1 or DH1 the least DM1 and DH1 bandwidth is used. Because one slot is used instead of three, the remaining 2 slots are free for other uses. The first choice is the DM1 because that is the one that has the forward error correction and so is more robust than DH1. The third choice would be a DM3, which occupies three slots, but if for some reason DM1 and DH1 are not allowed a DM3 and then DH3 will be chosen. If nether DM1, DH1, DH3 or DM3 is allowed then DM5 and DH5 are chose according to the table of FIG. 20.

Similarly packets are chose for other ranges of number of bytes to be transmitted. First the number of bytes is fitted into a range. Then the packet type is chosen by selecting the first type of packet that is allowed from the choices in the table. By using the table in FIG. 20 packet types may be automatically selected from the table of FIG. 20. The packet type is chosen by selecting the packet type that takes the least amount of space as a first criteria, and then selecting the packet that gives the most error correction. Since packet size is the first criteria for selecting packet types, the packet type selected may or may not have error correction. (using the table to select packet type for transmitting in a Bluetooth network is one of the claim areas). An important aspect of the present embodiment is that the segmenter's type and length selection for a given connection is not changed until that packet has been actually or otherwise flushed.

Another embodiment of the invention comprises a method by which unprotected fragments are selected to form a transmit FIFO. This embodiment is a way of choosing the lowest fragment to incorporate into a transmit FIFO. As discussed previously, a transmit FIFO is formed for a connection by stringing together fragments to hold the data to be transmitted to a particular connection. Each fragment is associated with a bit in the bit protect array 1011 (See FIG. 10). The present embodiment of the invention selects the lowest number fragment which has a protect array value of 0, that is it selects the first unprotected (unused) fragment.

Figure 21:
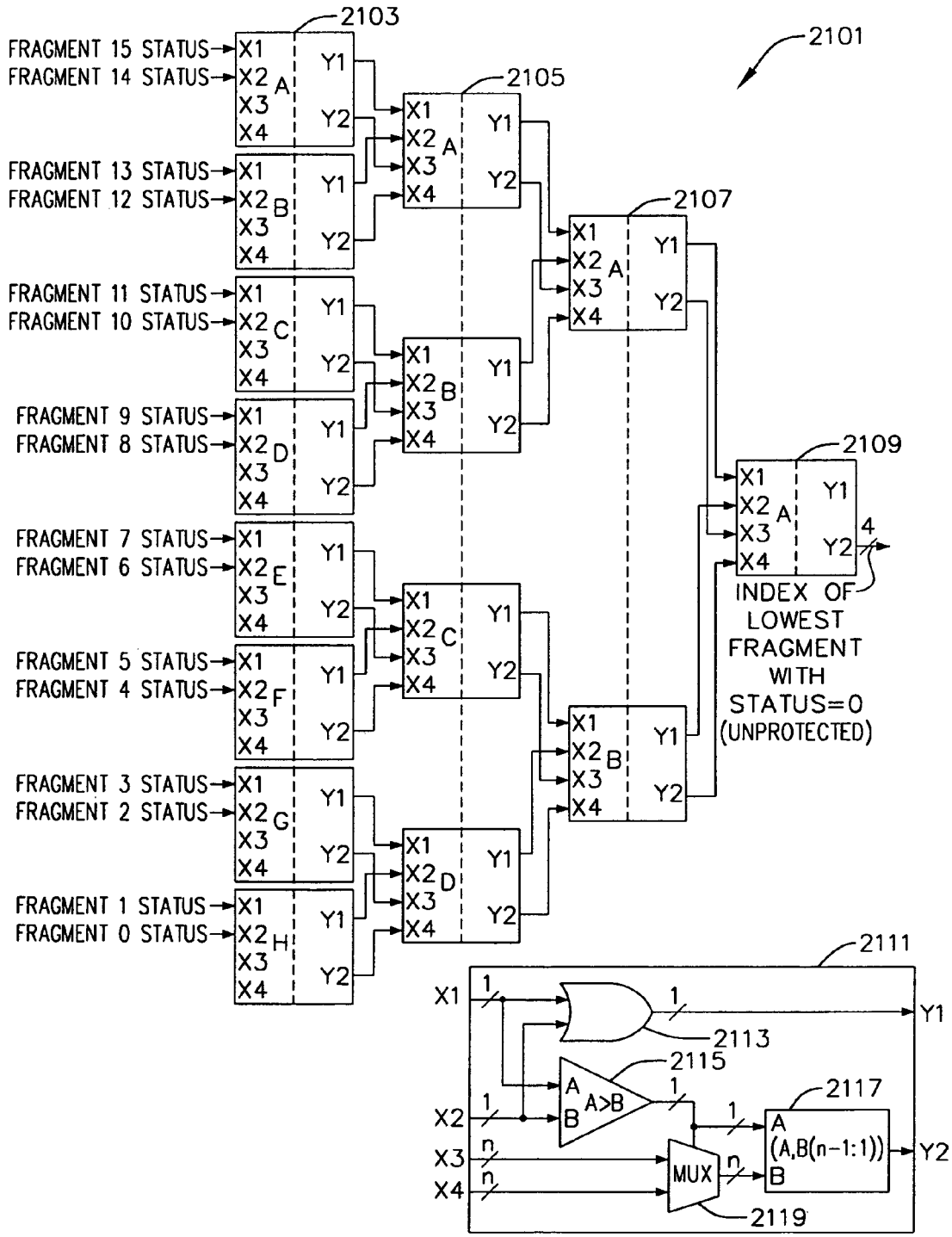
FIG. 21 is a schematic diagram of a fragment chooser circuit that accepts protect bits and produces the index of the lowest unoccupied fragment.

FIG. 21 is a schematic diagram of a fragment chooser circuit that accepts protect bits and produces the index of the lowest unoccupied fragment. So, for example, if fragments 0, 1, 2, 4, and 5 are occupied and the rest of the fragments are unoccupied, the fragment chooser will choose fragment 3 next. The fragment chooser illustrated in FIG. 21 is simplified one having only 16 fragments instead of 128. So if fragments 0, 1 and 3 were protected, the fragment chooser would output a value of 2. The fragment chooser is composed of a number of identical blocks 2111. The blocks are repeated multiple times (2103A through 2103H, 2105A through 2105D, 2017A and 2017B, and 2109A). The example of FIG. 21 is an Implementation of a 16 packet chooser which will select the lowest value of fragment, of 16 fragments, which is unprotected. The translation of the illustration of FIG. 21 to handle 128 fragments is straight forward. In a fragment chooser choosing from 128 fragments, the first level would have 64 blocks instead of 8 blocks (2103A through 2103F) of the exemplary circuit. Additionally, in the one of 128 fragment chooser the blocks 2111 would have a 7 bit input at X3 and X4 and a 7 bit output at Y2.

The blocks of the selector circuit (i.e., 2103A through 2103H, 2105A through 2105D, 2107A, 2107B and 2109A) are identical. That is the multiplexor 2119 switches between input X3 and input depending on the output of 2115 circuit. An if the output of circuit 2115 is a 1 if X1>X2, that is if X1=1 and X3=0. If the output of circuit 2115 is a 1 then multiplexer 2119 couples the value on X4 into circuit 2117. If the output of circuit 2115 is a 0 then multiplexer circuit couples the value of X3 into circuit 2117. Circuit 2117 is a shifter/concatenator circuit. It is going to take the value coupled to its B input shift it to the right by one and then insert the bit from the output of circuit 2115 to the MSB and then put the shifted and concatenated value at output Y2.

Circuit 2113 is an OR circuit which accepts X1 and X2 as its input and puts out a 1 if either or both inputs are 1 (unprotected).

Figure 24:
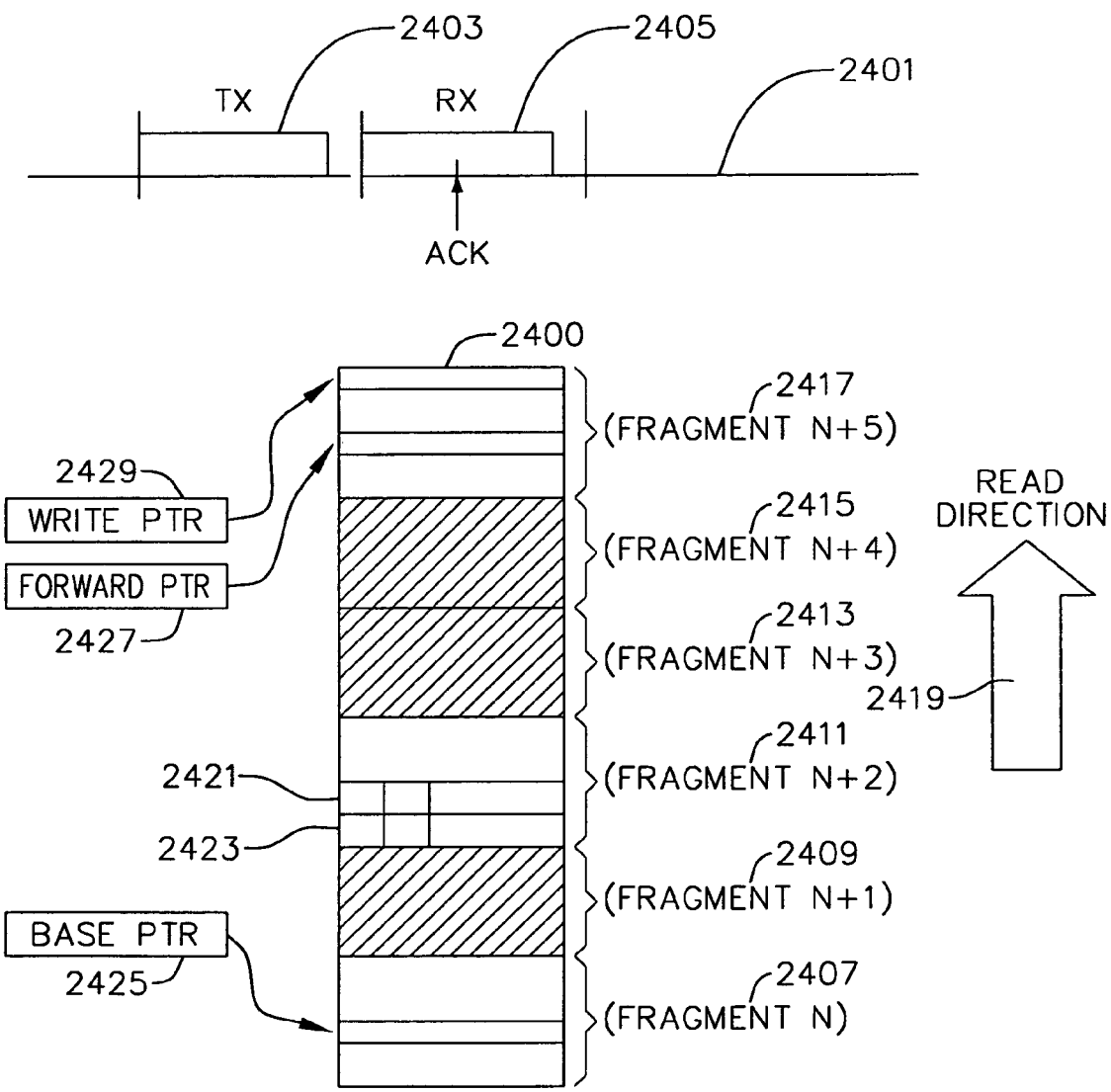
FIG. 24 is a graphical illustration of the operation of an automatic transmit FIFO according to an embodiment of the invention.

FIG. 24 is a graphical illustration of the operation of an automatic transmit FIFO according to an embodiment of the invention. For example suppose a Bluetooth transmission 2403 is followed by the reception of an acknowledgment of the transmission 2405. Since transmission 2403 has been acknowledged the transmit FIFO may remove the protection on the fragments used to make up the transmission 2403. For example, consider a portion of the transmit FIFO illustrated at 2400. Fragments N through N+5 are visible in the illustrated portion of the transmit FIFO 2400. Fragments 2409, 2413 and 2415 are being used by another connection not related to transmission 2403.

In the example illustrated in FIG. 24 the transmission 2403 will comprise portions of fragment 2407, 2411, and 2417. The base pointer 2425 represents the beginning of the transmission 2403. The base pointer 2425 and a forward pointer 2427 are initially pointed to the same location. The transmission 2403 sent and the forward pointer 2427 is pointing as shown in FIG. 24. The write pointer 2429 is pointing to the end of fragment 2417 indicating that more data has been placed in the transmit queue. Once transmission 2403 has been acknowledged base pointer 2425 can be advanced forward pointer 2427. Once base pointer 2425 has advanced through fragment 2407, the protection of fragment 2407 may be removed. The base pointer may then be advanced through fragment 2411 and then the protection on fragment 2411 can be removed, making that fragment available for general use. The base pointer 2425 will then be advanced to the position of the forward pointer 2427. The base pointer will then end up pointing at the same byte as the forward pointer 2427. The memory protection on fragment 2417 cannot be released because, as read pointer 2429 indicates, data remains in fragment 2417.

If the response 2405 of the transmission 2403 is an NAK (not acknowledged) the transmission must be repeated, and the forward pointer is set to point at the position of the base pointer 2425, and the transmission 2403 is then set to be repeated.

The forward pointer will trace a path through fragments of the transmit queue until the value of Byte Gauge says all bytes have been transmitted, or until 339 bytes have been transmitted or until an L2CAP boundary (for example if 2421 were an L2CAP boundary) is encountered.

Figure 25:
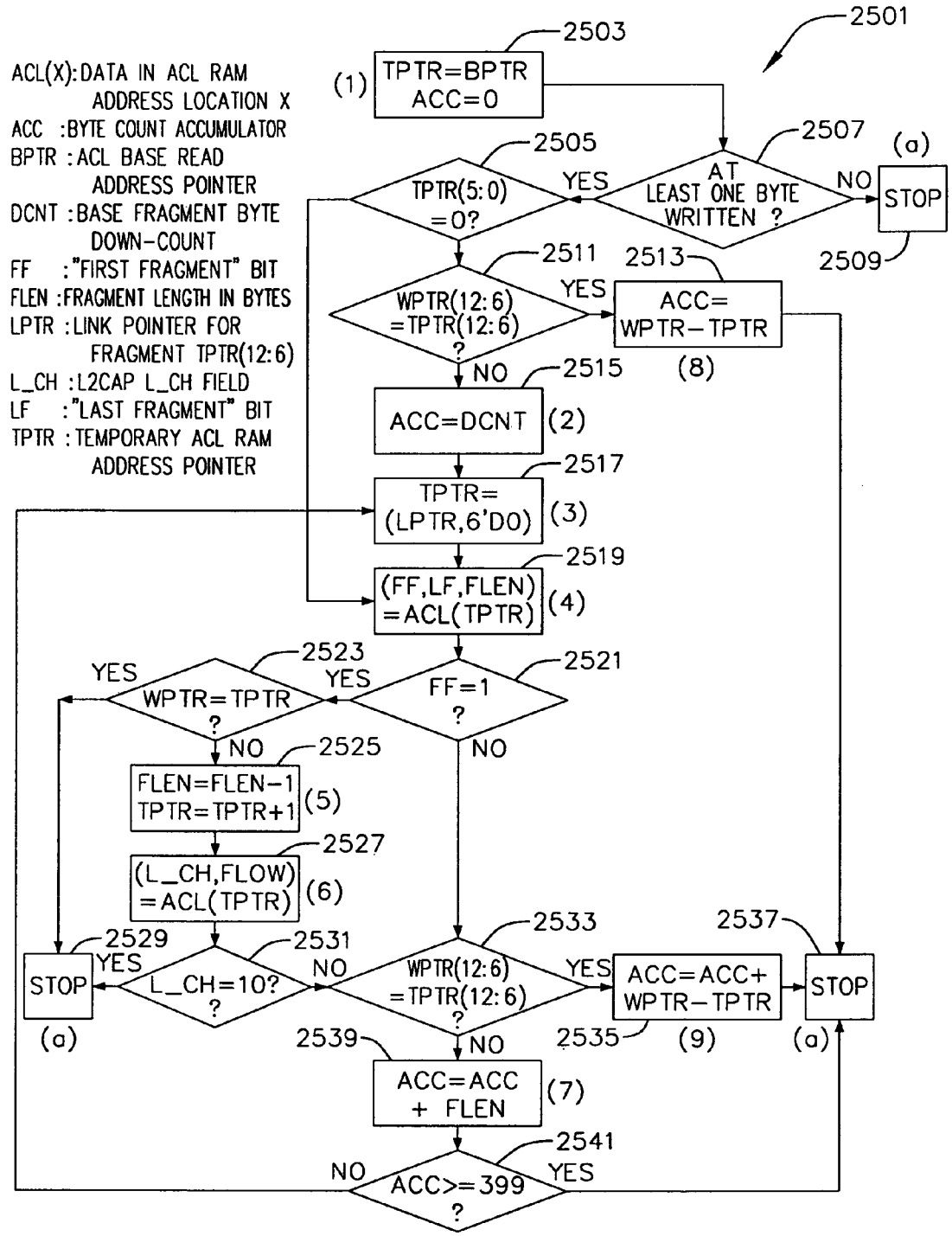
FIG. 25 is a flow diagram of the Byte Gauge process.

FIG. 25 is a flow diagram of the Byte Gauge process. (TED this description may require some work also) Several definitions are helpful in understanding flow diagram 2501. $ACL_X$ represents the data in the ACL RAM (transmit FIFO) address location X. ACC is an accumulator amount. Bptr is the base pointer, such as the base pointer 2425 of FIG. 24. The dcnt is the fragment based down-count. That is the number of bytes (to transmit) left in the current fragment to which the base pointer is pointing. FF is the first fragment bit, FF is contained in the fragment. FLEN is the amount of data contained in a fragment. FLEN is in the header also. Lptr is a link pointer. L_CH is the L2CAP field that is indicating start or continuation. A value "10" means start, a value of "01" means continuation. LF is the ast fragment bit. And then Tptr is the temporary pointer.

The variable "Past First Pass" PFP is included for the following reason. The Byte Gauge algorithm stops when it encounters an L2CAP boundary, indicated by a fragment with FF=1 and L_CH=10. However, just before any data belonging to a new L2CAP packet has been transmitted, the read address is already pointing to the first byte of a fragment with FF=1 and L_CH=10!.

Without the "Past First Pass" variable, the algorithm would stop right there, before it had even started, because it encountered that L2CAP boundary immediately! The "Past First Pass" variable prevents the algorithm from stopping when it immediately encounters an L2CAP boundary. The initial L2CAP boundary is the "First Pass"; initially, "Past First Pass" is set to zero so that when the "First Pass" is encountered, the algorithm does not stop. Once the Byte Gauge has encountered "First Pass" once, it is "past the First Pass", so it sets the "Past First Pass" variable to one, indicating that the algorithm should stop on any subsequent L2CAP boundaries.

Figure 26:
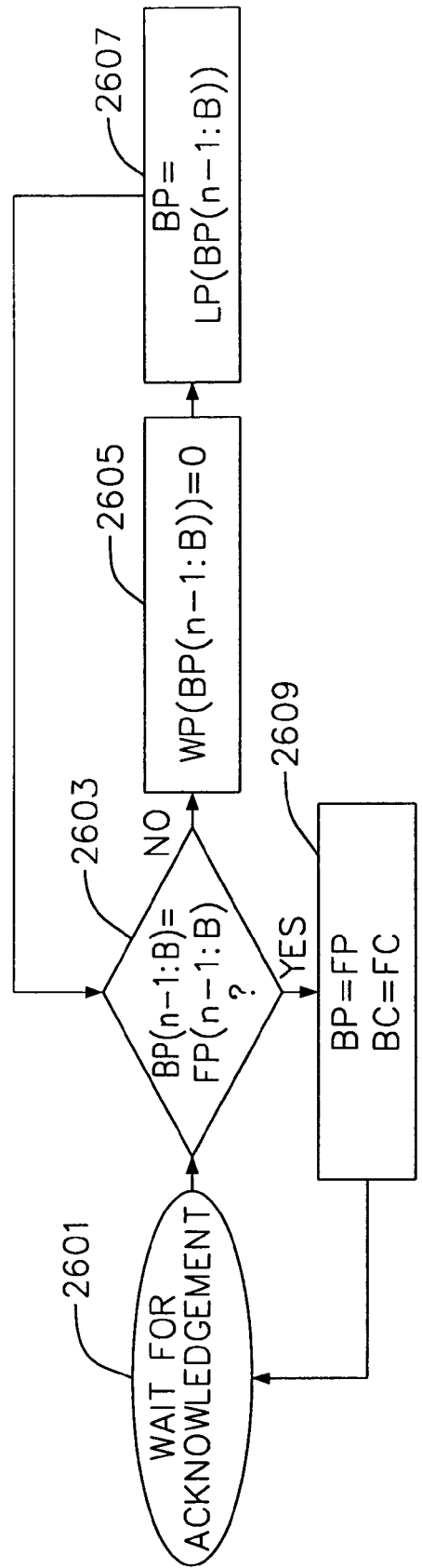
FIG. 26 is a flow diagram illustrating the L2CAP packet flush state machine, according to an embodiment of the invention.

FIG. 26 is a flow diagram illustrating the L2CAP packet flush state machine, according to an embodiment of the invention. The flow diagram starts with block 2601, which waits for the acknowledgment of a packet correctly received. When the acknowledgment comes, control is transferred to 2603. In 2603, the base pointer is checked to see if the forward pointer is in the same fragment. If the base pointer is not in the same fragment as the forward pointer control is transferred to block 2605. In 2605 the write protection of the current block is reset (unprotected). The base pointer (bp) is then moved to the next fragment, that is the linked list is followed to the next fragment. Control is then transferred back to block 2603 where the forward pointer is checked to see if it is in the same fragment as the base pointer (bp). If the base pointer is in the same fragment as the forward pointer (the forward pointer currently is pointing to the end of the packet) the result of block 2603 will be yes and then in block 2609 the base pointer is set equal to the forward pointer, the base counter is set equal to the forward counter, and control transfers to block 2601.

FIG. 27 is a flow diagram of an L2CAP packet transmit state machine, according to an embodiment of the invention. The initial state 2731 of the L2CAP packet transmit state machine is a wait for a request state. The request comes from the physical layer hardware, for example from the hardware doing forward error correction, encryption and whitening, which will be done prior to transmission of data. Once the request is made, in block 2733 the forward pointer 1006 is set equal to the base pointer 1005. If the previously sent packet was not acknowledged, the forward pointer would be pointing to the end of the unacknowledged packet. In that case the unacknowledged packet would need to be resent and the forward pointer 1006 would need to be set equal to the base pointer 1005. Then the variable pb is set equal to the packet length in bytes. The variable pb will be used as a down counter to count the bytes as they are sent. Also in step 2733 data-out is set equal to the first byte of the Bluetooth header, BBH1. BBH1 is determined entirely by the segmenter, so that at step 2733 nothing has been taken out of the transmit FIFO e.g. 903. The state machine then waits for another request at 2735 from the physical layer hardware. Once the request is received flow control bits for the Bluetooth packet header are provided. The state machine then waits for another request at 2739. When the next request arrives data-out is set equal to PLH1 which is the payload header. The payload header is either one or two bytes depending on whether its 20 packet being sent is a multi-slot packet or a single slot packet. Data-out is determined by the segmenter. The state machine then waits for another request at 2701. Nothing has been read for the transmit FIFO yet. Once the next request arrives control transfers to 2705. In 2705, if the segmenter has chosen a multi-slot packet then the physical layer would be provided with the second byte of the payload header, as indicated in 2703, and then the state machine awaits the next request in 2707. Once the next request arrives control transfers from block 2707 to block 2709. If, in block 2705, the segmenter had not indicated that a multi-slot slot packet was being sent, control would also transfer to block 2709.

In block 2707 a forward count (FC) down counter, is examined. The forward count down counter counts down from the fragment length. The FC as well as BC, a base down counter, start out with the value of the fragment length and then count down. These counters are needed because the state machine needs to know when one fragment is finished, in order to jump to another fragment. So if FC=1, the end of the fragment has not been reached yet and control transfers to block 2723, where the forward pointer is incremented, the forward count is decremented, and the payload byte down-count is decremented. If FC=0, the end of a fragment has been reached and control transfers to 2711, which asks is the base pointer bits 5 though 0 equal to 0? If yes, then the end of a fragment has actually not been reached; rather, the forward count has not been loaded yet. Control transfers to block 2715, where the fragment header is read from the memory location indicated by the base pointer. If the answer to block 2711 is no, then the end of the fragment has truly been reached and control transfers to block 2713, where the base pointer is moved to the beginning of the fragment indicated by the link list. Control then transfers to block 2717 where FC is loaded with the length field of the fragment header. The FC down count is going to count down from the length of the fragment. Control is then transferred to 2719, which asks if the current fragment is a first fragment? In other words is the FF bit equal to 1? If it is then it is necessary to read out one extra byte because the first fragment has one extra byte indicated by the L_CH field. If there is one extra byte, the forward count is decremented and the forward pointer is incremented, and then control is transferred to a block 2723 where the forward pointer is incremented, the forward count is decremented, and the packet byte count is decremented. Control is then transferred to 2725. In 2725 the data_out is set equal to the value of the memory array at the address location indicated by the forward pointer from the memory. The data_out is, once again, the byte that is being provided to the physical layer and control transfers to 2729. In Block 2729, the packet byte, is examined to see if the PB count has counted down to zero. If the PB count has not counted down to zero then control is transferred to block 2707, otherwise control is transferred to block 2731 at the beginning and waits for a request which will be the next packet. Now if the next packet is going to be a retransmission then what will have happened is the base pointer would have not moved up to the forward pointer. In other words, after the current packet the base pointer will stay where it is the forward pointer will be pointing to the end of the packet. But then when the packet is retransmitted the forward pointer will be reloaded with the value of the base pointer, in other words it will rewind back to the beginning of the packet. In block 2733, PB equals packet length. That packet length is chosen by the segmenter. In a retransmission a packet length will not have changed so exactly the same bytes will be read from the FIFO. Therefore the packet will be exactly the same as the previous one.

Although a preferred embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A wireless communications device, comprising:
a wireless transceiver being configured to wirelessly transmit voice and data; and
a processor coupled to the wireless transceiver, the processor having a memory such that the memory is inside of the processor, the memory comprising at least six FIFO memory structures in which each FIFO memory structure comprises a plurality of fragments, the at least six FIFO memory structures comprising at least three pairs of FIFO memory structures, each FIFO memory structure pair storing a different type of data packet that is being transmitted and received, the memory comprising a respective single bit array corresponding to each FIFO memory structure, each fragment of associated FIFO memory structure being associated with a respective bit in the respective single bit array, the respective bit providing a status of the associated fragment, the memory comprising a respective second array correspond to each FIFO memory structure, the respective second array storing a respective link list and being configured to control, via the respective link list, the sequence of memory fragments from which data is read.

2. The wireless communications device of claim 1 wherein the status indicated by the respective bit of the respective single bit array for each of the memory fragments is whether the respective memory fragment is empty.

3. The wireless communications device of claim 1 wherein the processor further comprises a read pointer configured to indicate the memory fragment from which the data is being read.

4. The wireless communications device of claim 1 wherein each of the memory fragments comprises 64 bytes.

5. The wireless communications device of claim 1 wherein the memory fragments comprises 128 memory fragments.

6. The wireless communications device of claim 5 wherein the respective second array comprises a 128 element array.

7. The wireless communications device of claim 1 wherein hardware within the processor splits at least one FIFO memory structure into a second plurality of FIFO memory structures, each of the second plurality of FIFO memory structures serving a different device.

8. The wireless communications device of claim 1 wherein a messaging mechanism reports an amount of memory available between a physical layer and a link control layer.

9. The wireless communications device of claim 1 wherein the processor pools memory among the at least six FIFO memory structures and dynamically allocates the memory among the at least six FIFO memory structures.

10. A processor comprising a memory such that the memory is inside of the processor, the memory having at least six FIFO memory structures in which each FIFO memory structure comprises a plurality of fragments, the at least six FIFO memory structures comprising at least three pairs of FIFO memory structures, each FIFO memory structure pair storing a different type of data packet that is being transmitted and received, the memory comprising a respective single bit array corresponding to each FIFO memory structure, each fragment of associated FIFO memory structure being associated with a respective bit in the respective single bit array, the respective bit providing a status of the associated fragment, the memory comprising a respective second array correspond to each FIFO memory structure, the respective second array storing a respective link list and being configured to control, via the respective link list, the sequence of memory fragments from which data is read.

11. The processor of claim 10 wherein the status indicated by the respective bit of the respective single bit array for each of the memory fragments is whether the respective memory fragment is empty.

12. The processor of claim 10 further comprising a read pointer configured to indicate the memory fragment from which the data is being read.

13. The processor of claim 10 wherein each of the memory fragments comprises 64 bytes.

14. The processor of claim 10 wherein the memory fragments comprises 128 memory fragments.

15. The processor of claim 14 wherein the respective second array comprises a 128 element array.

16. The processor of claim 10 wherein hardware within the processor splits at least one FIFO memory structure into a second plurality of FIFO memory structures, each of the second plurality of FIFO memory structures serving a different device.

17. The processor of claim 10 wherein a messaging mechanism reports an amount of memory available between a physical layer and a link control layer.

18. The processor of claim 10 wherein the processor pools memory among the at least six FIFO memory structures and dynamically allocates the memory among the at least six FIFO memory structures.

* * * * *